United States Patent [19]

Wakahara et al.

[11] Patent Number: 5,746,677

[45] Date of Patent: May 5, 1998

[54] VEHICLE TRANSMISSION SYSTEM

[75] Inventors: Tatsuo Wakahara, Kawasaki; Kenichiro Murakami, Ebina, both of Japan

[73] Assignee: Nissan Motor Co., Ltd., Yokohama, Japan

[21] Appl. No.: 531,740

[22] Filed: Sep. 21, 1995

[30] Foreign Application Priority Data

Sep. 21, 1994 [JP] Japan ................................ 6-226469

[51] Int. Cl.$^6$ .................................................. B60K 17/348
[52] U.S. Cl. ................................................ 477/35; 180/251
[58] Field of Search ............................. 74/467; 475/159; 184/6.23; 180/247, 251; 60/428, 431, 453; 477/35

[56] References Cited

U.S. PATENT DOCUMENTS

| | | | |
|---|---|---|---|
| 4,984,663 | 1/1991 | Kato | 180/251 X |
| 5,251,440 | 10/1993 | Bong-dong et al. | 60/428 X |
| 5,335,494 | 8/1994 | Benko et al. | 60/428 |

FOREIGN PATENT DOCUMENTS

| | | | |
|---|---|---|---|
| 7-186759 | 7/1995 | Japan . | |
| 2234030 | 1/1991 | United Kingdom | 180/247 |

OTHER PUBLICATIONS

"Service Circular for Nissan Skyline R32 Type Group 4WD Vehcile, vol. No. 629", Issued by Nissan Motor Co., Ltd. (1989), pp. C5–C22.

Primary Examiner—Khoi Q. Ta
Attorney, Agent, or Firm—Foley & Lardner

[57] ABSTRACT

A subpump assists a main pump for feeding hydraulic oil into a vehicle transmission system so as to control the distribution of the drive force transmitted to front and rear wheels. A motor for driving the subpump is started with a predetermined timing and energized for a predetermined drive time, so that the subpump circulates hydraulic oil with air which is mixed into the hydraulic oil by a chain that is turned in an oil tank, from a strainer chamber for the subpump, to prevent accumulation of air in the oil tank.

6 Claims, 15 Drawing Sheets

FIG_5

FIG_11
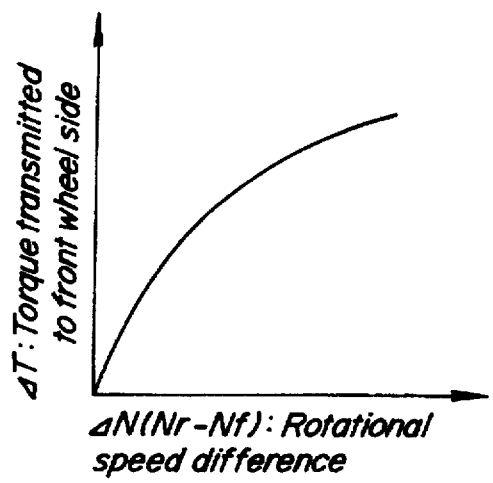
FIG_12
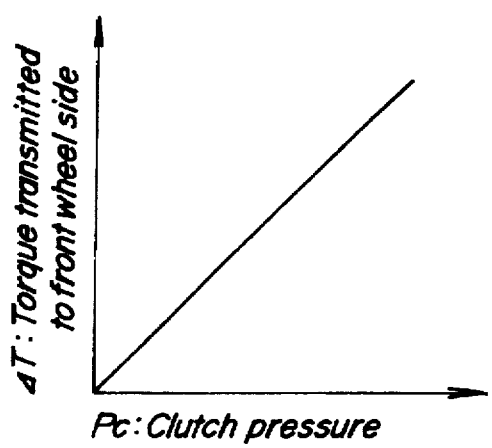
FIG_13
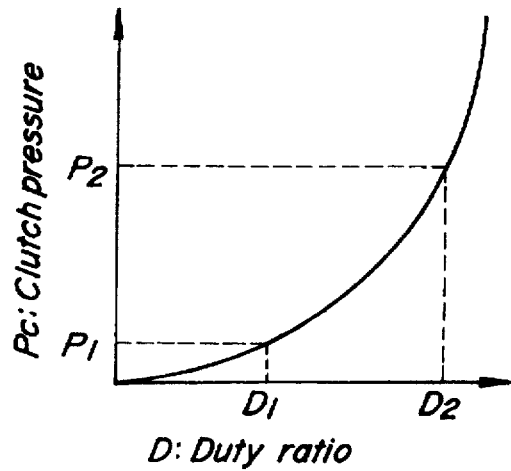

FIG_16

VEHICLE TRANSMISSION SYSTEM

BACKGROUND OF THE INVENTION

1. Field of the Invention

The present invention relates to a vehicle transmission system using, for example, a chain drive transmission type transfer.

2. Description of Related Art

For example, "Service Circular for Nissan Skyline R32 Type Group 4WD Vehicle, Vol. No. 629", issued in August, 1989, by Nissan Motor Co., Ltd., discloses a vehicle transmission system.

This conventional vehicle transmission system distributes the drive force from an engine, to the front and rear wheel sides of a vehicle, by means of a transfer having a wet-type multiple disc clutch (which will be hereinbelow denoted as "clutch") at a predetermined drive force distribution ratio after the drive force has been changed by a speed change gear. The drive force distributed to the front wheel side by the transfer, is transmitted by the rotation of a first sprocket coupled to the clutch hub of the clutch, through a chain wound on and stretched between the first sprocket and a second sprocket coupled to a front wheel side output shaft.

In this arrangement, the distribution of the drive force by the transfer can be made by controlling a clutch pressure $P_C$ in a hydraulic pressure supply device so as to control the fastening force of the clutch in the transfer. Thus, the control of distribution of the drive force is carried out.

Further, Japanese Patent Application Laid-Open Publication No. 7-186,759, which has been published on Jul. 25, 1995 and which is thus a non-prepublished earlier application by the applicants, discloses a hydraulic pressure supply device for a transfer, in which a main pump directly coupled to the output shaft of a speed change gear for rotating the pump, produces a predetermined line pressure $P_L$ which is then controlled to a predetermined clutch pressure $P_C$ in accordance with a control signal delivered from a controller. Further, if no sufficient drive force for rotation can be obtained from the speed change gear, for example, during low speed running or backward running, a motor is energized to drive a subpump for feeding a hydraulic pressure which assists the hydraulic pressure fed from the main pump so as to ensure a required line pressure $P_L$.

The above-mentioned first sprocket, second sprocket, chain and the like, are accommodated in a transfer casing which also serves as an oil tank and which is formed in the hydraulic pressure supply device. The main pump is rotated by the drive force transmitted from the speed change gear. Further, the motor is energized as necessary so as to drive the subpump in order to ensure the predetermined line pressure $P_L$ which is then reduced to the predetermined clutch pressure $P_C$ in accordance with a control signal from the controller. Accordingly, the fastening force of the clutch is controlled in accordance with the clutch pressure $P_C$ so as to achieve a predetermined distribution of the drive force from the speed change gear to the front and rear wheel sides. That is, the clutch hub is rotated through the drive force allocation so as to rotate the first sprocket for turning the chain which therefore agitates hydraulic oil in the oil tank, causing a required stream of the hydraulic oil and lubrication, and which also drives the second sprocket in order to transmit the drive force to the front wheel side.

At this time, the main pump and the subpump suck thereinto hydraulic oil from the oil tank through the strainer which is composed of two strainer chamber 221a, 222a as shown in FIG. 7. That is, the main pump sucks up the hydraulic oil from the strainer 221a while the subpump sucks up the hydraulic oil from the strainer chamber 222a.

The above-mentioned transmission system can ensure the line pressure $P_L$ with which sufficient drive force can be obtained from the speed change gear when the vehicle runs forward in a 2WD mode at a high speed, and accordingly, only the main pump is operated since no operation of the subpump is required.

In this arrangement, air is mixed in hydraulic oil in the oil tank since the chain is turned so as to agitate the hydraulic oil. The air comes up and accumulates on the surface of the hydraulic oil in the upper part of the oil tank in the manner of the substitution at the liquid surface, and accordingly, the hydraulic oil in which air is mixed is led into the strainer chambers 221a, 222a. The hydraulic oil in which air is mixed is circulated in the strainer chamber 221a since the main pump is operated, and accordingly, no problem occurs even though the hydraulic oil is agitated by the chain. On the contrary, in the strainer chamber 222a where the hydraulic oil in which air is mixed is pooled, the air comes up and accumulates at the surface of the hydraulic oil due to the substitution at the liquid surface since the motor is energized so that the subpump does not work to circulate the hydraulic oil. Should the running speed of the vehicle be lowered, should the vehicle be restarted and so forth in this condition, the subpump which is started by the energized motor would suck up the air accumulating in the strainer chamber 222a. Accordingly, suction of such air would cause the hydraulic pressure to fail to rise up to a required pressure, or the desired line pressure $P_L$, and accordingly, the clutch pressure $P_C$ would be lowered so that no predetermined distribution of drive force could be carried out, resulting in such a problem that the performance of the vehicle deteriorates.

SUMMARY OF THE INVENTION

The present invention has been conceived in view of the above-mentioned problem which has not yet been solved, and accordingly, one object of the present invention is to provide a vehicle transmission system which can prevent air from accumulating in hydraulic oil due to the agitation by a chain, so as to ensure a predetermined line pressure $P_L$.

To the end, according to the present invention, there is provided a vehicle transmission system comprising an input shaft to which a drive force is transmitted from a rotary drive source, an output shaft through which the drive force is transmitted to the wheel side from the input shaft, a hydraulic circuit for feeding hydraulic fluid having a predetermined pressure so as to change the drive force transmitted to the input shaft, a main pump driven by the drive force from the rotary drive source and a subpump driven by a motor, fluid pressure supply means for feeding a predetermined pressure to the hydraulic circuit in accordance with a hydraulic pressure obtained by these pumps which suck up the hydraulic oil from a tank, motor control means for controlling the drive of the motor in accordance with a predetermined condition, motor control condition detecting means for detecting a control condition of the motor by the motor control means, and auxiliary motor control means for starting the energization of the motor for a predetermined time with a preset timing during a period in which the motor control condition detecting means detects a stop condition of the motor.

In the vehicle transmission system according to the present invention, the motor control condition detecting means detects a motor control condition, and the auxiliary motor control means energizes the motor with a preset timing during a period in which the motor control condition detecting means detects a stop control condition of the motor. Thus, the subpump circulates the hydraulic oil mixed with air in a suction chamber even though the hydraulic oil is mixed with air within the hydraulic tank since the drive force to which the hydraulic circuit changes the drive force transmitted to the input shaft from the rotary drive source in accordance with a predetermined pressure fed by the hydraulic pressure supply device, is transmitted to the output shaft by a drive force transmitting means such as a chain which is incorporated in the hydraulic fluid tank and which agitated the same, and so forth. Thus, it is possible to prevent occurrence of air accumulation in the hydraulic fluid in the suction chamber.

Advantageously, the auxiliary motor control means includes vehicle speed detecting means for detecting a vehicle speed, and at least either the timing for starting the motor or the motor energizing time is set in accordance with a vehicle speed detected by the vehicle speed detecting means.

In this instance, because the auxiliary motor control means set at least either a starting timing for starting the energization of the motor or a drive time during which the motor is energized, in accordance with a vehicle speed detected by the vehicle speed detecting means, it is possible to effectively prevent occurrence of air accumulation in the hydraulic fluid.

Advantageously, the auxiliary motor control means starts the motor at intervals which become shorter as the vehicle speed increases.

In this instance, because the auxiliary motor control means effectively starts the energization of the motor at intervals which are shorter as the vehicle speed increases, it is possible to prevent occurrence of air accumulation, even though the mixing rate of air in the hydraulic fluid increases as the vehicle speed increases since, for example, the drive force transmitting means agitates the hydraulic oil and so forth.

Advantageously, the motor auxiliary control means energizes said motor for a drive time which is longer as the vehicle speed increases.

In this instance, because the auxiliary motor control means effectively energizes the motor for a time which is longer as the vehicle speed increases, it is possible to prevent occurrence of air accumulation, even though the mingling rate of air in the hydraulic fluid increases as the vehicle speed increases since, for example, the drive force transmitting means agitates the hydraulic oil and so forth.

BRIEF DESCRIPTION OF THE DRAWINGS

FIG. 11 is a graph showing a characteristic curve exhibiting the relationship between a rotational speed difference $\Delta N$ and a torque $\Delta T$ transmitted to the front wheel side;

FIG. 12 is a graph showing a characteristic curve exhibiting the relationship between a clutch pressure $P_C$ and a torque $\Delta T$ transmitted to the front wheel side;

FIG. 13 is a graph showing a characteristic curve exhibiting the relationship between a duty ratio and a clutch pressure $P_C$;

DESCRIPTION OF THE PREFERRED EMBODIMENTS

An embodiment of the present invention will now be described below with reference to the accompanying drawings.

Figure 1:
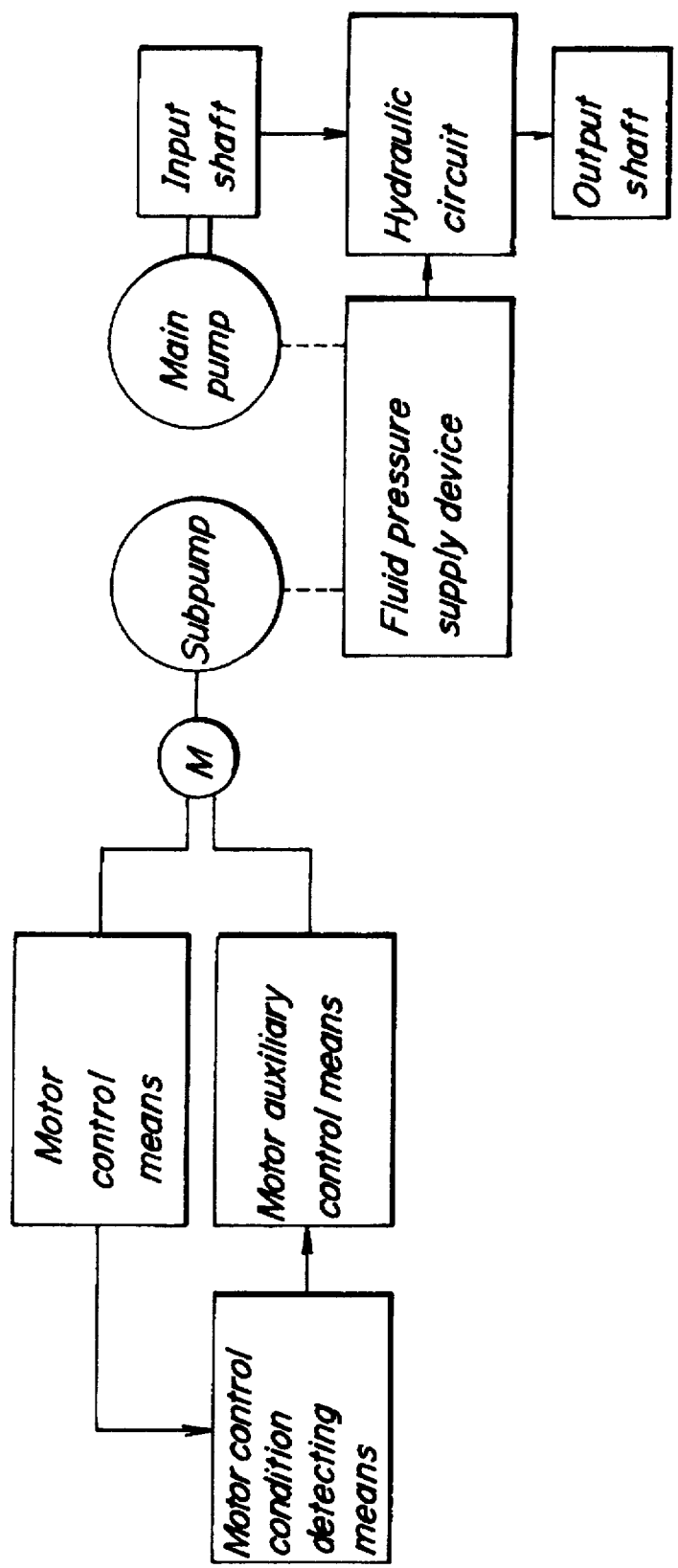
FIG. 1 is a block diagram showing the basic arrangement of a vehicle transmission system according to the present invention.
Figure 2:
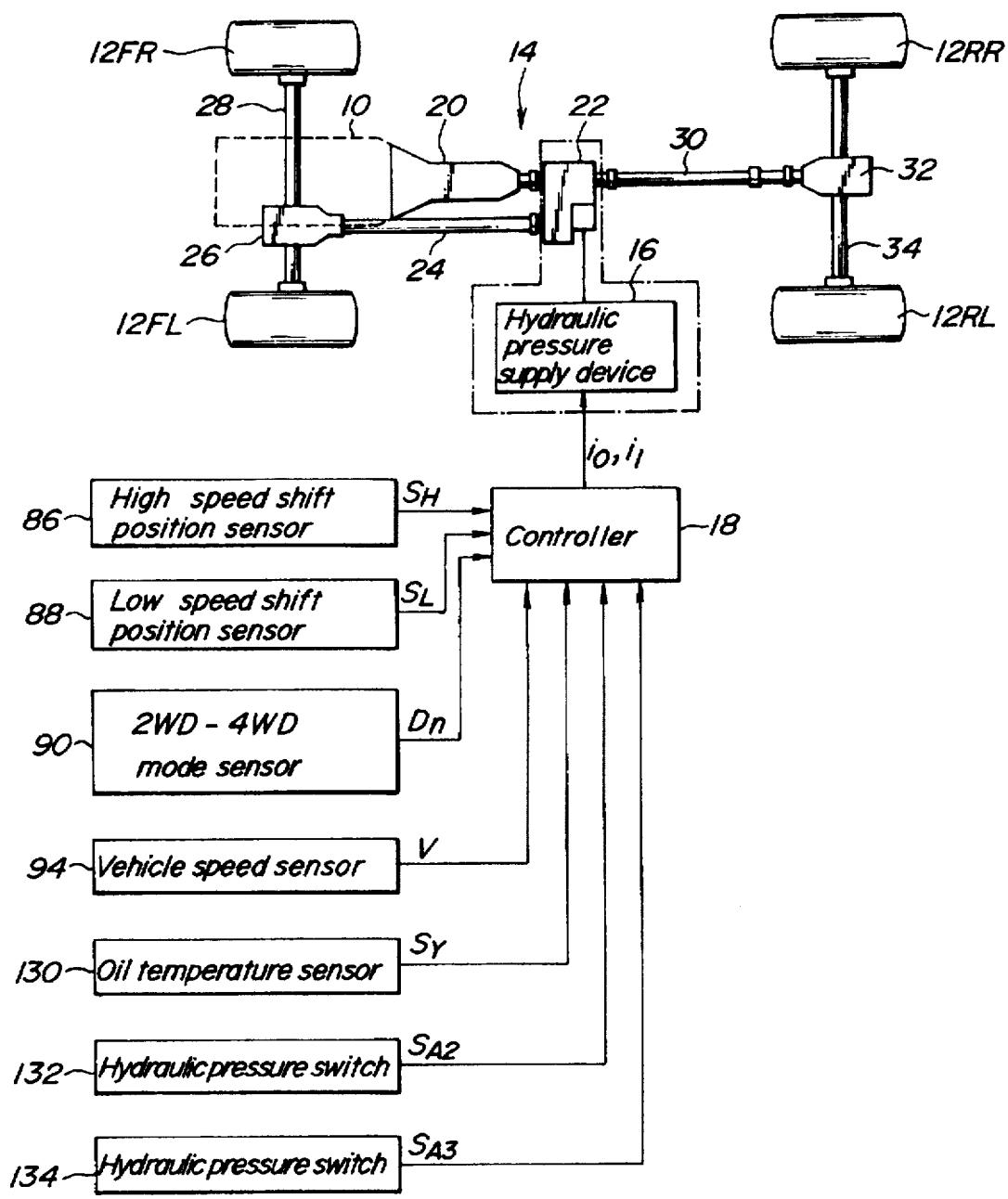
FIG. 2 is a schematic view illustrating the basic arrangement of the vehicle transmission system according to the present invention.

FIG. 2 shows a part-time four wheel drive vehicle based upon an FR (front-engine and rear drive) system, incorporating an engine 10 as a rotary drive source, front left to rear right wheels 12FL, 12FR, 12RL and 12RR, a drive force transmission system 14 for changing the distribution ratio of drive force transmitted to the four wheels 12FL to 12RR, a hydraulic pressure supply device 16 for supplying a hydraulic pressure adapted to control the distribution of drive force by the transmission system 14, and a controller 18 for controlling the hydraulic pressure supply device 16.

The transmission system 14 comprises a speed change gear 20 for shifting the drive force of the engine 10 with a selected gear ratio, and a transfer 22 for branching the drive force from the speed change gear 20, between the front wheels 12FL, 12FR and the rear wheels (normal drive wheels) 12RL, 12RR. In this transmission system 14, a front wheel side drive force into which the transfer 22 branches the drive force, is transmitted to the front wheels 12FL, 12FR by way of a front wheel side output shaft 24, a front differential gear 26 and front side drive shafts 28. Similarly, a rear wheel side drive force is transmitted to the rear wheels 12RL, 12RR by way of a propeller shaft (rear wheel side output shaft) 30, a rear differential gear 32 and drive shafts 34.

Figure 3:
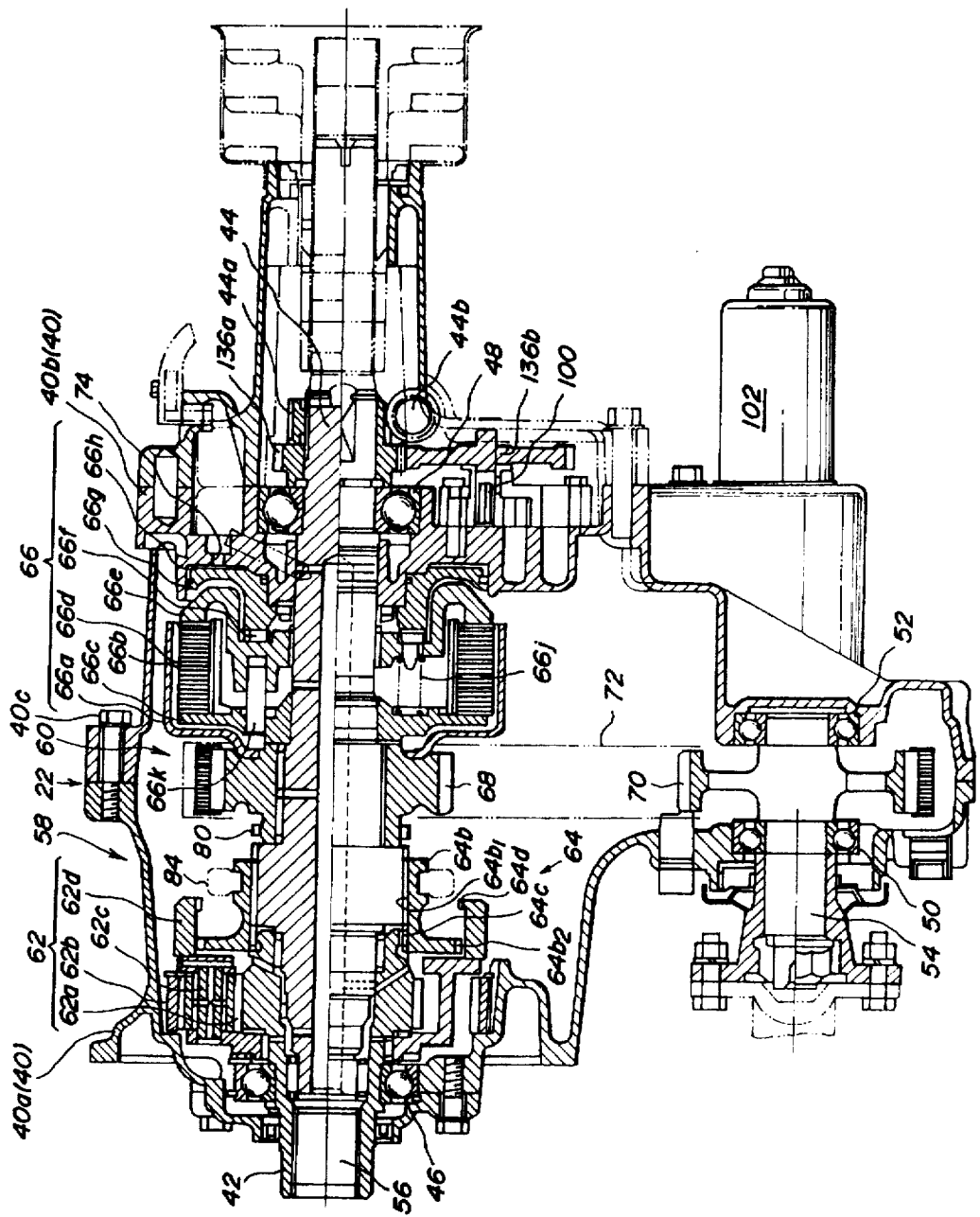
FIG. 3 is a view illustrating the interior structure of a transfer according to the present invention.

Referring to FIG. 3, there is shown the interior structure of the transfer 22 having a transfer casing 40. An input shaft 42 and a first output shaft 44 are arranged in the casing 40, being axially opposed to each other, in such a manner that the input shaft 42 is rotatably supported to a front casing section 40a by means of a radial bearing 46 while the first output shaft 44 is rotatably supported to a rear casing section 40b by means of a radial bearing 48, so that they can be rotated relative to each other. A second output shaft 54 is rotatably supported by means of bearings 50, 52 which are fitted respectively in the front and rear casing sections 40a, 40b, in parallel with the input shaft 42 and the first output shaft 44. It is noted that the input shaft 42 is coupled to an output shaft 56 of the speed change gear 20, the first output shaft 44 coupled to the rear wheel side output shaft 30, and the second output shaft 54 coupled to the front wheel side output shaft 24.

Further, an auxiliary speed change mechanism 58 and a two- and four-wheel drive change-over mechanism 60 are provided for the input shaft 42 and the first-output shaft 44, respectively.

The auxiliary speed change mechanism 58 is composed of a planetary gear mechanism 62 and a meshing clutch type high- and low-speed change-over mechanism 64 which is arranged coaxial with the planetary gear mechanism 62.

The planetary gear mechanism 62 is composed of a sun gear 62 formed around the outer periphery of the input shaft 42, an internal gear 62b fixed in the front casing section 40a, pinions 62c meshed with the sun gear 62a and the internal gear 62b, and a pinion carrier 62d which rotatably supports the pinions 62c.

Further, the high- and low-speed change-over mechanism 64 is composed of a shift sleeve 65b which is axially slidable due to the spline-coupling between a plurality of key grooves and internal teeth $64b_1$, having its outer periphery formed with external tooth $64b_2$, a high-speed shift gear 64c adapted to be meshed with the internal tooth $64b_1$ of the shift sleeve 64b and formed around the outer periphery of the shift sleeve 64b, and a low-speed shift gear 64b adapted to be meshed with the external teeth $64b_2$ of the shift sleeve 64b and formed on the inner peripheral part of the pinion carrier 62d.

Figure 4:
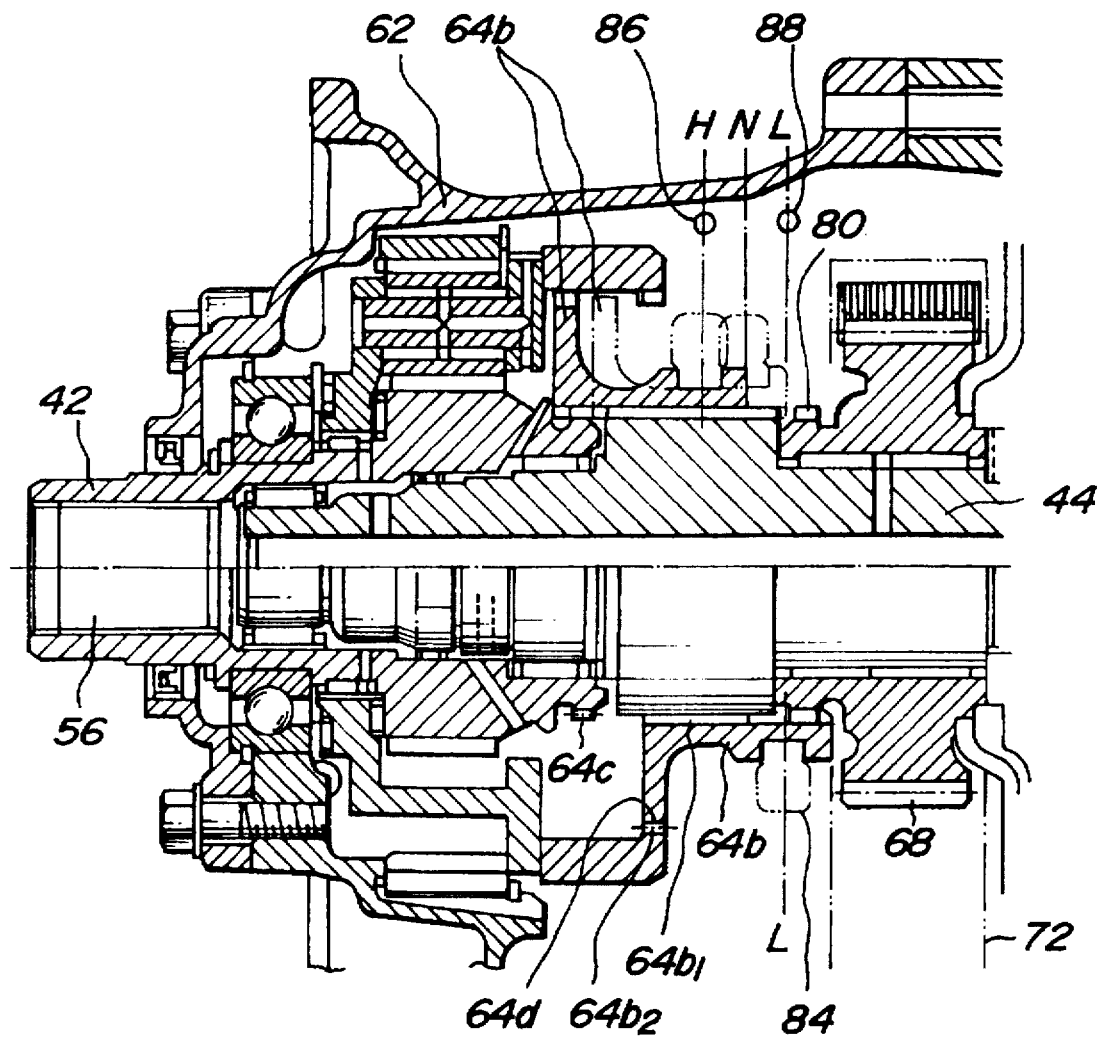
FIG. 4 is an explanatory view showing the operation of a shift sleeve.

When the shift sleeve 64b is slid up to a high speed shift position H as indicated by the solid line in the upper side of FIG. 4, the high speed shift gear 64c is meshed with the internal teeth $64b_1$. When the shift sleeve 64b is slid up to a low speed shift position L as shown in the lower side of FIG. 4, the low speed shift gear 64d is meshed with the external teeth $64b_2$. Further, when the shift sleeve 64b is shifted to a neutral position N as indicated by the imaginary line in the upper side of FIG. 4, the internal teeth $64b_1$ and the external teeth $64b_2$ are not meshed with any of other gears in the high- and low-speed change-over mechanism 64.

Referring again to FIG. 3, the two- and four-wheel drive change-over mechanism 60 is composed of a wet type multi-disc friction clutch 66 as a variable torque clutch for changing the distribution ratio of drive force between the front and rear wheels, a first sprocket 68 rotatably fitted on the first output shaft 44, a second sprocket 70 coupled coaxially with the first output shaft 44, and a chain 72 wound on and stretched between the first and second sprockets 68, 70.

The friction clutch 66 is composed of a clutch drum 66a coupled to the first sprocket 68, friction plates 66b spline-coupled to the clutch drum 66a, a clutch hub 66c spline-coupled with the outer periphery of the first input shaft 44, friction discs 66d integrally coupled with the clutch hub 66c and interposed between the adjacent clutch plates 66b, a rotary member 66e arranged around the outer periphery of the first output shaft 44 and adapted to be moved toward the clutch drum 66a so as to bring the friction plates 66b and the friction discs 66d into contact with one another, a pin 66k integrally coupled to the clutch hub 66c so as to engage the clutch hub 66c with the rotary member 66e, a clutch piston 66g mounted to the internal wall of the rear casing section 40b and adapted to be axially moved, and a thrust bearing 66f for transmitting the axial movement of the clutch piston 66g to the rotary member 66c, a cylinder chamber 66h defined between the inner walls of the clutch piston 66g and the rear casing 40b, and a return spring 66g urging the rotary member 66e toward the clutch piston 66g.

Further, when the clutch pressure $P_C$ is fed from the hydraulic pressure supply device 16 to an inlet port 74 formed in the rear casing section 40b and communicated with the cylinder chamber 66h, the clutch piston 66g is moved to the right in FIG. 3, due to a pressing force generated in the cylinder chamber 66h. Therefore, the movement of the clutch piston 66g is transmitted to the rotary member 66e through the thrust bearing 66f. The friction plates 66b and the friction discs 66d which have been separated from one another are thus brought into contact with one another since the friction discs 66d is moved. Accordingly, a fastening force corresponding to the clutch pressure $P_C$ is effected through the friction force thereof. The rotary drive force of the first output shaft is thus transmitted to the second output shaft 54 through the first sprocket 68, the chain 72 and the second sprocket 70 at a predetermined torque distribution ratio corresponding to the fastening force of the friction clutch 66.

When the clutch pressure $P_C$ to be fed is lowered so that the rotary member 66e and the clutch piston 66g is moved toward right in FIG. 3 by the urging force of the return spring 66j, resulting in separation between the friction plates 66 and the friction discs 66d are disengaged from each other so that no rotary drive force of the first output shaft 44 is transmitted to the second output shaft 54.

A four wheel drive gear 80 is incorporated to the first sprocket 68 around the outer periphery thereof on the shift sleeve 64b, and meshed with the internal teeth 64b, in addition to the meshing between the external teeth $64b_2$ and the low speed shift gear 64d, when the shift sleeve 64b is moved to the above-mentioned low speed position L shown in FIG. 4. With this arrangement, the shift sleeve 64 and the four wheel drive gear 80 constitute a dog clutch for forcing the first output shaft 44 and the second output shaft 54 to be coupled with each other at the low speed position.

Further, the shift sleeve 64b in the high- and low-speed change-over mechanism 64 of the meshing clutch type is slid to the high speed shift position H, the neutral position N or the low speed shift position L by means of a fork (only the front end part 84 of the fork is shown in FIG. 4), by manipulating an auxiliary speed change lever (not shown). In this arrangement, a high speed shift position sensor 86 for detecting the shift sleeve 64b which has been slid to the high speed position H, and a low speed shift position sensor 88 for detecting the shift sleeve 64b has been slid to the low speed shift position L, are arranged in the front casing section 40a. The high speed position sensor 86 and the low speed position sensor 88 deliver respectively a detection signal $S_H$ and a detection signal $S_L$ to the controller 18 from time to time.

Figure 5:
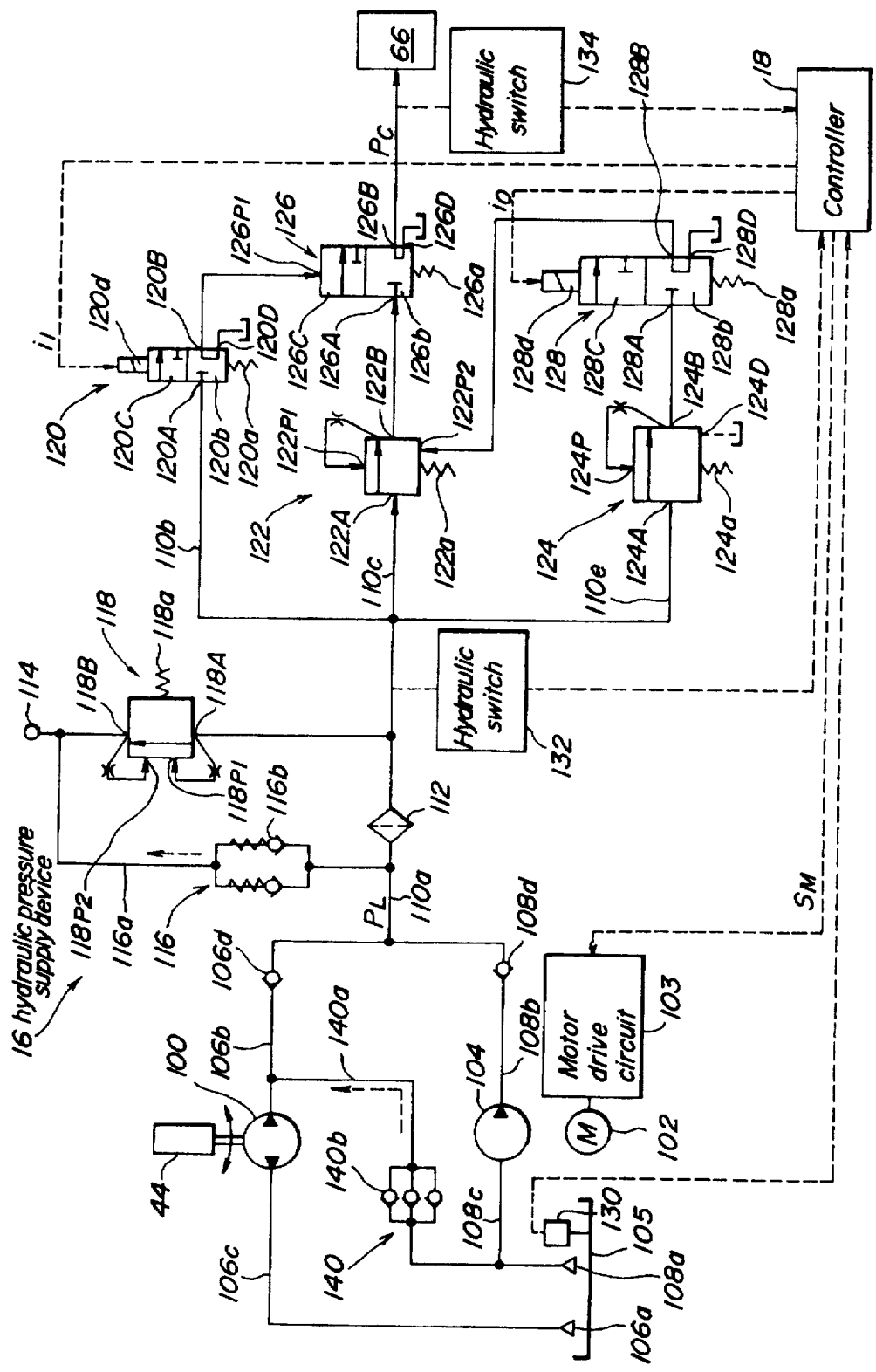
FIG. 5 is a block diagram illustrating a hydraulic pressure supply circuit according to the present invention.

The above-mentioned hydraulic pressure supply device 16 feeds a predetermined clutch pressure $P_C$ to the inlet port 74 of the transfer 22 by means of a circuit arrangement shown in FIG. 5.

This hydraulic pressure supply device 16 includes, as a hydraulic pressure source, a reversible rotation type main pump 100 directly coupled to the input shaft 42 which, in turn, is coupled to the output side of the speed change gear 20, and a normal rotation type subpump 104 connected in parallel with the main pump 100 and rotated by a motor 102 as a power source. The main pump 100 and the subpump 104 suck up hydraulic oil from the oil tank 105 through strainers 106a, 108a, and delivers the same into discharge side pipe lines 106b, 108b. A manifold pipe 110a from which the discharge pipe lines 106a, 108a branch off, is connected thereto with an oil element 112 which is connected at the upstream side thereof (the main pump 100 and the subpump 104 side) with one end of a relief passage 116 connected at the other end thereof to a lubrication system 114. Further, the oil element is also connected on the downstream side thereof (the transfer 22 side) with a line pressure regulating valve 118, and pipe lines 110b, 110c, 110e branching off from the manifold pipe 110a are connected thereto with the inlet sides of a solenoid selector valve 120, a clutch pressure regulating valve 122 and a pressure reducing valve 124, respectively. The clutch pressure regulating valve 122 is connected on the outlet side thereof with the inlet side of a pilot-operated selector valve 126 for feeding the clutch pressure $P_C$ to the transfer 22 when a pilot pressure is fed thereto from the solenoid selector valve 120. The pressure reducing valve 124 is connected on the outlet side thereof with the inlet side of a duty control solenoid valve 128. It is noted that a temperature sensor 130 for detecting a temperature of hydraulic oil is located in the oil tank 105. A hydraulic pressure switch for detecting a pressure to which the line pressure 118 decreases the line pressure, and a hydraulic pressure switch 134 for detecting the clutch pressure $P_C$ delivered from the pilot selector valve 126, are also provided. These sensor and switches delivering their detection signals to the controller.

The hydraulic pressure supply device 16 is located in the transfer 22 in the case of an actual vehicle, the main pump 100 for sucking up hydraulic oil from the oil tank 105 is coupled to the first output shaft 44 through a first gear 136a and a second gear 136b as shown in FIG. 3, and the subpump 104 is coupled to motor 102 externally attached to the transfer casing 40.

Further, as shown in FIG. 3, the transfer casing 40 is composed of the front casing section 40a located on the front wheel side, and the rear casing section 40b located on the rear wheel side. The front and rear casing sections 40a, 40b are integrally incorporated with each other by means of fastening bolts 40c inserted through bolt insertion holes formed in flange parts which are formed at the peripheral edge parts of the casing sections 40a, 40b and which are mated together with their insertion holes aligned with one another. The integrated transfer casing 40 defines therein the oil tank 105 for the hydraulic pressure supply device 16.

Figure 6:
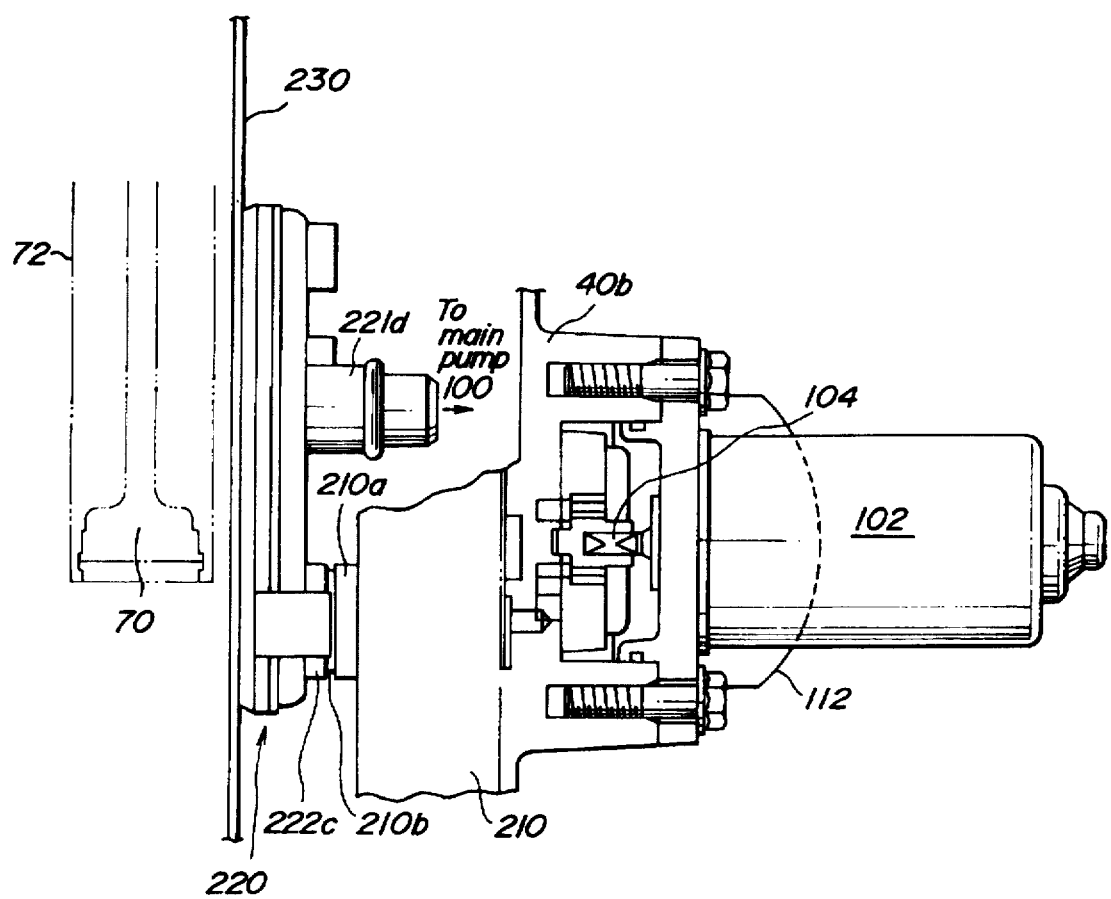
FIG. 6 is a side view illustrating a strainer unit.

The motor 102 is mounted to the exterior of the right lower part of the rear casing section 40b, as shown in FIG. 6, and is directly coupled to the subpump 104. A control unit 210 is attached to the interior of the rear casing 40b section opposite to the subpump 104, and a strainer unit 20 is arranged integrally with the control unit 210. Further, a baffle plate 230 which can prevent, as a main purpose, interference between the incorporated parts such as the control unit 210 and the strainer unit 220, and the chain 72 is also incorporated. Further, the oil element 112 is externally attached.

The hydraulic oil is delivered from the oil tank 105 to the control unit 210 through the strainer unit 220 by means of the main pump 100 and the subpump 104, and the hydraulic pressure supply device 16 incorporated in the control unit 210 carries out a predetermined process so as to deliver the clutch pressure $P_C$ which is fed to the friction clutch 66.

The above-mentioned control unit 210 is a block-like unit body incorporating the valves, the sensors and the like shown in FIG. 5, and fitted in fitting holes formed in the unit body in which hydraulic passages similar to the pipe lines shown in FIG. 5, communicate the fitting holes.

The above-mentioned strainer unit 220 defines therein strainer chambers 221a, 222a as suction chambers in which meshes are located, and which are separated from each other. The strainer chamber 221a corresponds to the strainer 106a for the main pump 100, and the strainer chamber 222a corresponds to the strainer 108a for the subpump 104.

The strainer chambers 221a, 222a are formed therein with suction ports 221b, 222b, and also with a discharge port 221c for the main pump 100 and a discharge port 222c for the subpump 104, respectively. The discharge port 221c for the main pump 100 consists of a pipe projected from the rear surface of the unit. Further, the discharge port 222c for the subpump 104 is fitted at its outer peripheral edge with a lip-type packing.

In this strainer unit 220, the discharge port 221c for the main pump is opposed to an oil receiving port (not shown) which is formed inside of the rear casing section 40b, for the main pump. As shown in FIG. 6, an oil receiving port 210a of the control unit 210 is joined with the discharge port 222c for the subpump by bolts with the lip type packing 210b interposed between their outer edges. Thus, the strainer unit 220 is connected to the subpump 100 through the intermediary of the control unit 210.

Further, a baffle plate 230 as a plate-like member is arranged at a surface of the strainer unit 220, which is not faced to the control unit 210, between the surface and the chain 72 so as to cover the whole strainer unit therewith, so that the baffle plate 220 urges the trainer unit 220.

Figure 8:
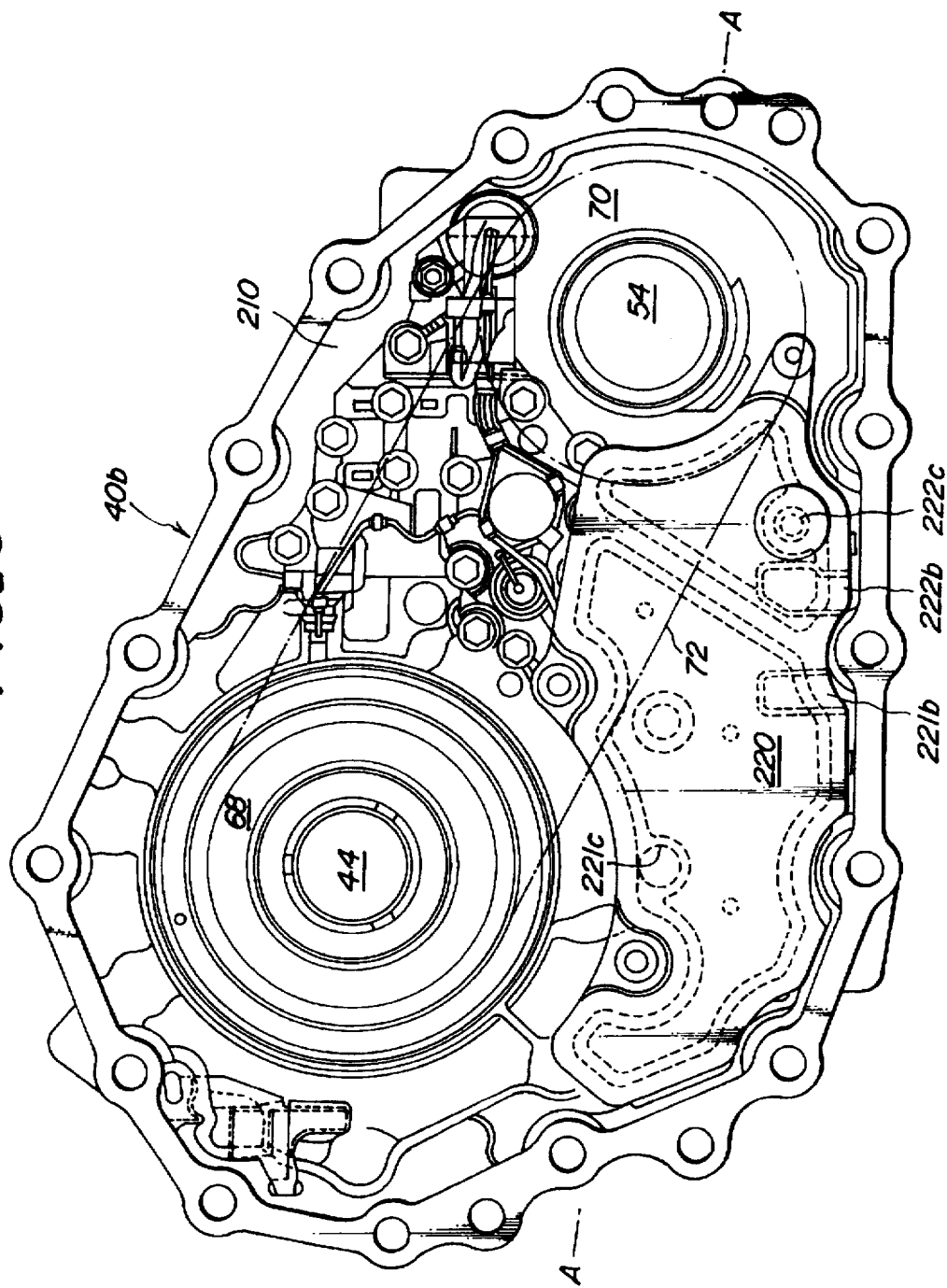
FIG. 8 is a view illustrating a condition in which a control unit, the strainer unit and a baffle plate are incorporated in a rear casing.

Accordingly, as shown in FIG. 8, the control unit 210 is located in the rear casing section 40b, and the strainer unit 220 is integrally incorporated with the upper part thereof. The baffle plate 230 (not shown in FIG. 8) is arranged in the upper part thereof, and the chain 72 wound on and stretched between the first and second sprockets 68, 70 is arranged thereabove. The transfer casing 40 defines therein the oil tank 105. For example, as shown by the one-dot chain line A in FIG. 8, when the chain 72 is turned as the first sprocket 68 is rotated in accordance with a fastening force of the friction clutch 66, the chain 72 rotates the second sprocket 70 while it agitates hydraulic oil stored in the oil tank 105.

Next, detailed description will be made of the components of the hydraulic pressure supply device 16, with reference to FIG. 5.

The main pump 100 on normal rotation sucks up hydraulic oil from the oil tank 105 through the strainer 106a connected to one end of the suction pipe line 106c. Further, the subpump 194 sucks up the hydraulic oil from the oil tank 105 through the strainer 108a connected to the end part of the suction pipe 108c. Check valves 106d, 108d are connected in the pump discharge pipe lines 106b, 108b connected to the manifold pipe 110, respectively, and a bypass passage 140 is connected between the discharge pipe line 106b of the main pump 100 and the suction pipe line 108c of the subpump 104. The bypass passage 140 is composed of a bypass pipe line 140a and a triple-check valve 140b connected in the bypass pipe line 140a. The check valve 140b is opened when the pressure in the discharge pipe line 106b becomes negative, so as to establish a communication passage through which hydraulic oil flows in the arrow indicated by the broken line.

A relief passage 116 connected to the manifold pipe 110a upstream of the oil element 112, is composed of a relief pipe line 116a connected at the other end to the lubrication system 114 side, and a spring-loaded twin check valve 116b connected in the relief pipe line 116a. If a filter in the oil element 112 clogs so that the pressure upstream of the oil element 112 exceeds a predetermined pressure, the check valve 116b opens so as to establish a communication passage through which hydraulic oil flows in the arrow indicated by the broken line.

The line pressure regulating valve 118 is composed of an internal pilot and a spring type pressure reducing valve, including a spool slidably fitted in a cylindrical valve housing having an inlet port 118A connected to the manifold pipe 110a side, an outlet port 118B connected to the lubrication system 114 side, and internal pilot ports $118P_1$, $118P_2$ to which primary and secondary pressures are fed through fixed orifices, the slider being urged to one end side by a return spring 118a. Further, the supply pressure $P_L$ raised by the main pump 100 or the subpump 104 is set to a predetermined pressure by the line pressure regulating valve 118, and is then fed to a solenoid selector valve 120, the clutch pressure regulating valve 122 and the pressure reducing valve 124. It is noted that hydraulic oil is discharged from the output port 118B when the pressure is reduced to a set value, is returned to the lubrication system 114.

Further, the clutch pressure regulating valve 122 is composed of internal and external pilots and a spring type pressure regulating valve, including a spool slidably fitted in a cylindrical valve housing having an inlet port 122A connected to the pipe line 110c, an outlet port 122B connected to a pilot selector valve 126, an internal pilot port $122P_1$ to which secondary pressure is fed through a fixed restrictor as a pilot pressure, and an external port $122P_2$ to which a control pressure is fed from a duty control solenoid valve 128, the spool being urged to one end side by a return spring 122a. The clutch pressure regulating valve 122 does not feed the secondary pressure since a communication passage between the inlet port 122A, and the outlet port 122B is blocked when no pilot control pressure is fed from the duty control solenoid valve 128. However, when the pilot control pressure is fed from the duty control solenoid valve 128, the spool is moved under control so that the secondary pressure in accordance with the pilot control pressure is red as the clutch pressure $P_C$ from the outlet port 112B.

A pressure reducing valve 124 is composed of an internal pilot and a spring type and constant secondary pressure type pressure reducing valve, including a spool slidably fitted in a cylindrical valve housing having an inlet port 124A connected to the pipe line 110e, an outlet port 124B connected to a duty control solenoid valve 128, an internal pilot port 124P to which the secondary pressure is fed, as a pilot pressure, through a fixed restrictor from the outlet port 124B, and a drain port 124D, the spool being urged to one end side by a return spring 124a. When the spool is moved under control to a predetermined position by the pilot pressure fed to the internal pilot port 124P, the primary pressure fed from the inlet port 124A is fed, as a control pressure reduced and regulated to a predetermined pressure, to the duty control solenoid valve 128.

The duty control solenoid valve 128 is of a three port and two position type having an inlet port 128A, and a drain port 128D connected to the drain side, an outlet port 128B connected to the external pilot port $122P_2$ of the clutch pressure regulating valve 122, and a return spring 128a, and a spool located in the valve. The spool is movable under a control between a normal position where the outlet port 128B is communicated to the drain port D, and an operating position 128c where the inlet port 128A is communicated with the outlet port 128B. When the controller 18 delivers an exciting current $i_0$ having a required duty ratio to a solenoid 128d, the spool is moved under control from the normal position 128b to the operating position 128c, overcoming the return spring 128a during a period in which the exciting current $i_0$ is turned on. Thus, the pilot control pressure in accordance with the duty ratio is fed to the clutch pressure regulating valve 122. Accordingly, the clutch pressure regulating valve 122 feeds the clutch pressure $P_C$ in accordance with a pilot control pressure which is fed to the external pilot port $122P_2$ from the duty control solenoid valve 128. As a result, the clutch fastening force of the friction clutch 66 is controlled so as to distribute a drive torque to the front wheels in accordance with the clutch pressure $P_C$.

The spring off-set type solenoid selector valve 120 is of a three port and two position type having an inlet port 120A to which the line pressure is fed, an outlet port 120B connected to the external pilot port $126P_1$ of the pilot selector valve 126, and a drain port 120D. A spool is located in the valve and is movable under control between a normal position 120b where the inlet port 120A is blocked though the outlet port 120B is communicated with the drain port 120D, and an operating position 120c where the inlet port 120A is communicated with the outlet port 120B, though the drain port 120D is blocked. Further, in the solenoid selector valve 120, when the controller 18 delivers an exciting current $i_1$ to a solenoid 120d, the spool is moved under control to the operating position 120c, overcoming the return spring 120a during a period in which the exciting current $i_1$ is turned on. Accordingly, a pilot control pressure is fed to the external pilot port $126P_1$ of the pilot selector valve 126. Further, when the exciting current $i_1$ from the controller 18 is turned off, the spool is returned to the normal position by the urging force of the return spring 120a. Accordingly, the pilot control pressure having been fed to the external pilot port $126P_1$ is led to through the drain port 120D so as to be suppressed.

Figure 9:
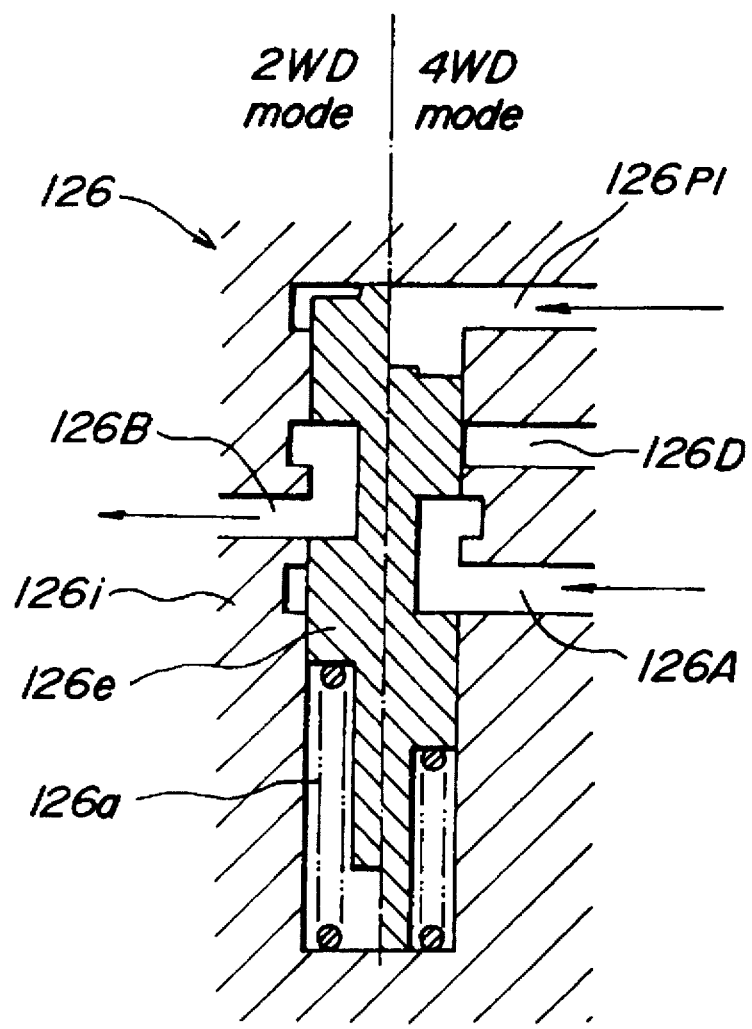
FIG. 9 is an explanatory view showing the operation of a pilot-operated selector valve.

As shown in FIG. 9, the pilot selector valve 126 includes a spool 126e which is slidably fitted in a cylindrical valve housing 126i having an inlet port 126A to which the secondary pressure is fed from the clutch pressure regulating valve 122, an outlet port 126B from which the secondary pressure is fed to the transfer 22, the above-mentioned external pilot port $126P_1$ to which a control pressure is fed when the solenoid 120 of the solenoid selector valve 120 is deenergized, and a drain port 126D, the spool being urged to one end side by a return spring 126a. It is noted that the control pressure fed from the external pilot port $126P_1$ is fed in the same direction as that of the urging force of the return spring 126a.

The spool 126e in the pilot selector valve 126 is moved under control to a 2WD mode position where the inlet port 126A and the outlet port 126B are blocked, and the outlet port 126B is communicated with the drain port 126D (as shown in the cross-sectional view in the left half of FIG. 9) when no control pressure is fed to the external pilot port $126P_1$.

When a solenoid 120d in the solenoid selector valve 120 is energized (turned on), the spool in the solenoid selector valve 120 is moved under control to the operating position 120c, and is further moved to a 4WD mode position where the control pressure is fed to the external pilot port $126P_1$ and the inlet port 126A is communicated with the outlet port 126B (as shown in the cross-sectional view in the right half side of FIG. 9).

Thus, by driving the pilot selector valve 126 with the pilot control pressure from the solenoid selector valve 120, the spool 126e can be driven by a high pilot control pressure, and it is thus possible to ensure the slide movement of the spool 126e even though the slide resistance to the spool 126e is high due to dust, chips or the like sticking to the slide passage for the spool 126e.

Meanwhile, the controller 18 delivers the exciting currents $i_0$, $i_1$ in accordance with detection signals from the high speed shift position sensor 86, the low speed shift position sensor 88, the 2WD–4WD mode sensor 90 which is turned on when, for example, the 2H range is selected by setting the counter speed change to the 2H range, and the vehicle speed sensor 94 as the vehicle speed detecting means. It is noted that one and the same controller 18 performs, in this embodiment, the control for the hydraulic pressure supply device 16 which can therefore holds a predetermined hydraulic pressure. Accordingly, the above-mentioned oil temperature sensor 130 and hydraulic pressure switches 132, 134 are incorporated, and the controller 18 delivers control signals $S_O$, $S_M$ in accordance with detection signals from these sensors to the hydraulic pressure supply device 18.

The vehicle speed sensor 94 delivers a vehicle speed signal V obtained from a speed meter pinion 44b meshed with the first output shaft 44 through the intermediary of a gear 44a, as shown in FIG. 3.

The hydraulic pressure switch 132 turns on a detection signal $SA_2$ when a detected hydraulic pressure value becomes lower than a preset value. Similarly, the hydraulic pressure switch 134 turns on a detection signal $SA_3$ when a detected hydraulic pressure value becomes lower than a preset value. The hydraulic pressure switches 132, 134 delivers these signals to the controller 18.

The oil temperature sensor 130 detects a temperature of hydraulic oil in the oil tank 105, and an A/D converter converts a detection signal from the sensor 130 into a digital signal $S_Y$ and delivers the same to the controller 18.

Figure 10:
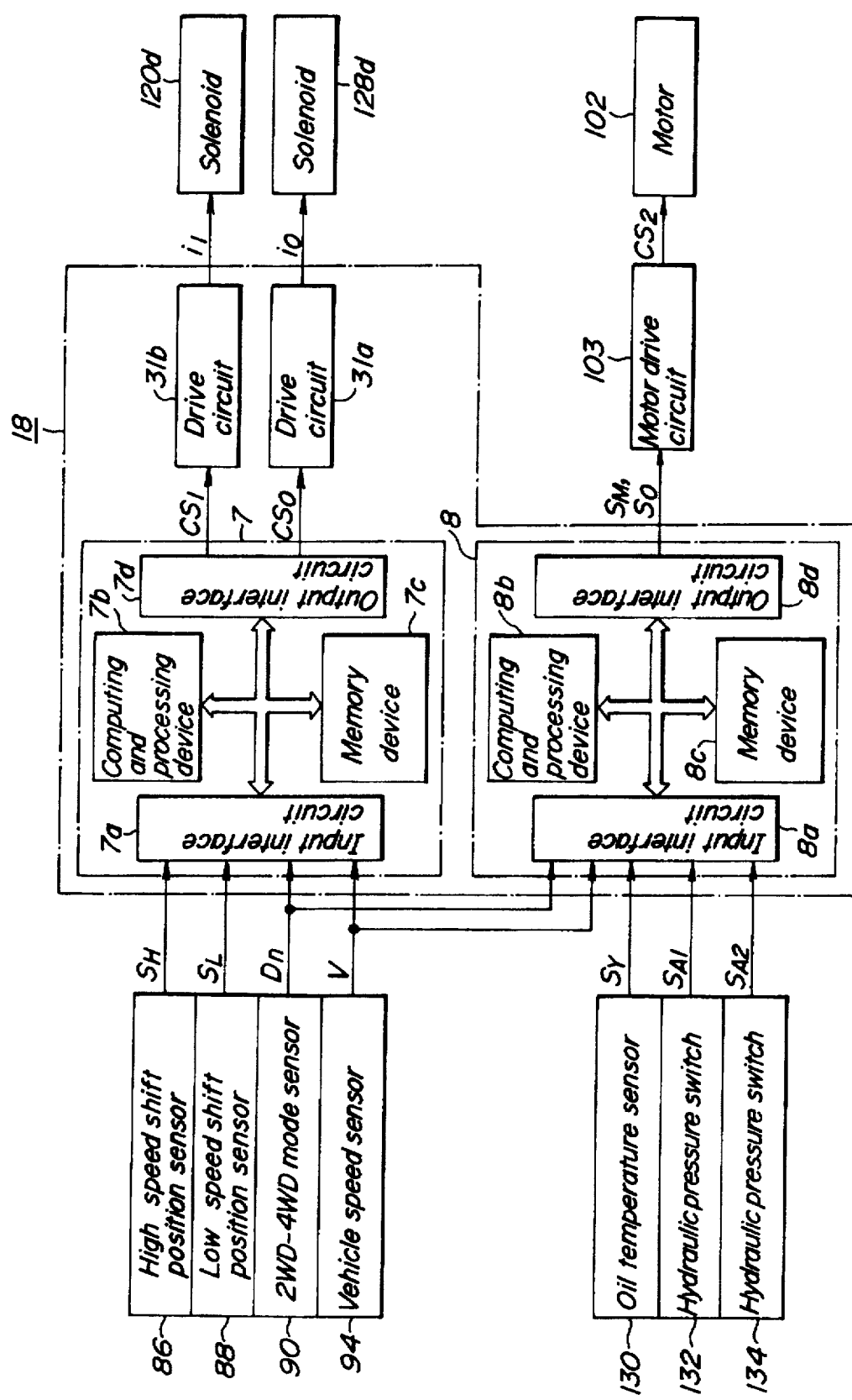
FIG. 10 is a block diagram showing the arrangement of the controller.

This controller 18 is composed, as shown in FIG. 10, of a microcomputer 7 for processing the control of distribution of drive force by the friction clutch 66, a microcomputer 8 for processing the control of drive of the motor 102 for holding a predetermined hydraulic pressure, a drive circuit 31a for delivering an exciting current $i_0$ having a predetermined ratio D to the solenoid 128d of the above-mentioned hydraulic pressure device 16 in accordance with a control signal $CS_0$ from the microcomputer 7, and a drive circuit 31b for delivering an exciting signal $i_1$ which is turned on and off in accordance with a control signal $CS_1$ from the microcomputer 7, to the solenoid 120d of the solenoid selector valve 120 in the hydraulic pressure supply device 16.

The microcomputer 7 is composed of an input interface circuit 7a having an A–D converting function for reading detection signals, as detected values, from the high speed shift position sensor 86, the low speed shift position sensor 88, the 2WD–4WD mode sensor 90 and the vehicle speed sensor 94, a computing and processing unit 7b for performing predetermined computation and process for the control of distribution of drive force in accordance with a given program, a memory device 7c including ROM, RAM and the like, and an output interface circuit 7d for delivering the control signal $CS_0$ which instructs a clutch pressure $P_C$ for determining the allocation of torque to the front wheel side, corresponding to a difference ΔN in rotational speed between the front and rear wheels, obtained by the computing and processing unit 7b, and the control signal $CS_1$ for determining whether the clutch pressure $P_C$ is delivered or not.

The above-mentioned microcomputer 8 is composed of an input interface 8a having an A–D converting function for reading detection signals as detected values, from the oil temperature sensor 130, the hydraulic pressure switches 132, 134, the 2WD–4WD mode sensor 90 and the vehicle speed sensor 94, a computing and processing unit 8b, a memory device 8c including ROM, RAM and the like, an output interface circuit 8d having a D-A function for delivering a motor speed instruction value obtained by the computing and processing unit 8b, as, for example, an analog voltage signal $S_M$.

The microcomputer 7 sets a front wheel side torque distribution instruction value ΔT in accordance with a mode signal $D_n$ from the 2WD–4WD mode sensor 90, a high-speed shift position detection signal $S_H$ from the high-speed position sensor 86, a low-speed shift position detection signal $S_L$ from the low-speed shift position sensor 88 and a vehicle speed signal V from the vehicle speed sensor 94, and sets the control signals $CS_0$, $CS_1$ for delivering the clutch pressure $P_C$ in accordance with the thus set front wheel torque distribution instruction value ΔT. Then, the thus set control signals $CS_0$, $CS_1$ are delivered to the drive circuits 31a, 31b.

The above-mentioned drive circuit 31a includes, for example, a pulse width modulation circuit for delivering an exciting current $i_0$ having a duty ratio D corresponding to the instruction value of the control signal $CS_0$ which is an analog voltage signal delivered from the microcomputer 7, to the solenoid 128d of the duty control solenoid valve 128.

The drive circuit 31b converts the control signal $CS_1$ delivered from the microcomputer 7 into an exciting current $i_1$ having a current value which can excite the solenoid 120d of the solenoid valve 120, and delivers the exciting current $i_1$ to the latter.

The computing process carried out by the microcomputer 8, that is, the control for allowing the hydraulic pressure supply device to feed a predetermined hydraulic pressure, is as follows: when the hydraulic pressure switch 132 detects such a condition that the line pressure $P_L$ downstream of the oil element 112 in the manifold pipe 110 is lower than a set value, the control signal $S_M$ indicating a rotational speed instruction value set in accordance with an oil temperature detection value $S_Y$ delivered from the oil temperature sensor 130, is computed by a computing process which is not shown, in order to control the discharge pressure (oil volume) from the subpump 104, and is then delivered to the motor drive circuit 103 for controlling the rotational speed of the motor 102 to maintain the line pressure $P_L$ fed by the hydraulic pressure device 16 at a predetermined pressure. It is noted that the pilot selector valve is determined to be abnormal so as to issue an alarm when such a condition is detected that the detection signal of the high speed shift position sensor 86 is turned on, and the hydraulic pressure switch 134 detects the clutch pressure $P_C$ fed from the pilot selector valve 126 is zero.

It is noted that the memory device 7c of the microcomputer 7 stores therein a program necessary for executing a process carried by the computing and processing unit 7b, fixed data and the like, and also can temporarily stores the result of the computation.

The above-mentioned fixed data includes memory tables corresponding to control characteristics shown in FIGS. 11 to 13. FIG. 11 shows a control characteristic of the torque ΔT transmitted to the front wheel side, v.s. the difference ΔN in rotational speed between the front and rear wheels. From this control characteristic, the distribution of drive force is carried out such that the transmission torque ΔT is adjusted in accordance with a value of the difference ΔN in rotational speed, that is, the transmission torque ΔT increases parabolically as the difference ΔN in rotational speed increases. FIG. 12 shows the value of the transmission torque ΔT which increases linearly as the clutch pressure $P_C$ of the pilot selector valve 126 increases. Further, FIG. 13 shows the value of the clutch pressure $P_C$ of the clutch pressure regulating valve 122, which increases nonlinearly and parabolically in accordance with increase in the duty ratio D of the exciting current $i_o$ fed to the solenoid 128d of the duty control solenoid valve 128.

When the transmission torque ΔT is determined by referring to the memory table corresponding to FIG. 11, the memory tables corresponding to FIGS. 12 and 13 are successively referred to, and a value of the duty ratio D which the controller 10 should deliver is inversely computed. Further, when a clutch pressure in a range from $P_1$ to $P_2$ corresponding to a duty ratio in a range from $D_1$ to $D_2$ is fed to the friction clutch 66 as shown in FIG. 13, the distribution ratio of torque between the front and rear sides, in range from rear wheel side:front wheel side=100%:0% to 0% to 50%:50%, is continuously transmitted in accordance with a fastening force of the friction clutch 66.

If the duty ratio is less than $D_1$, the clutch pressure $P_C$ is produced so that the friction plates 66b and the friction discs 66d in the friction clutch 66 are brought into pressure contact with one another, but no drive force is transmitted.

Figure 14:
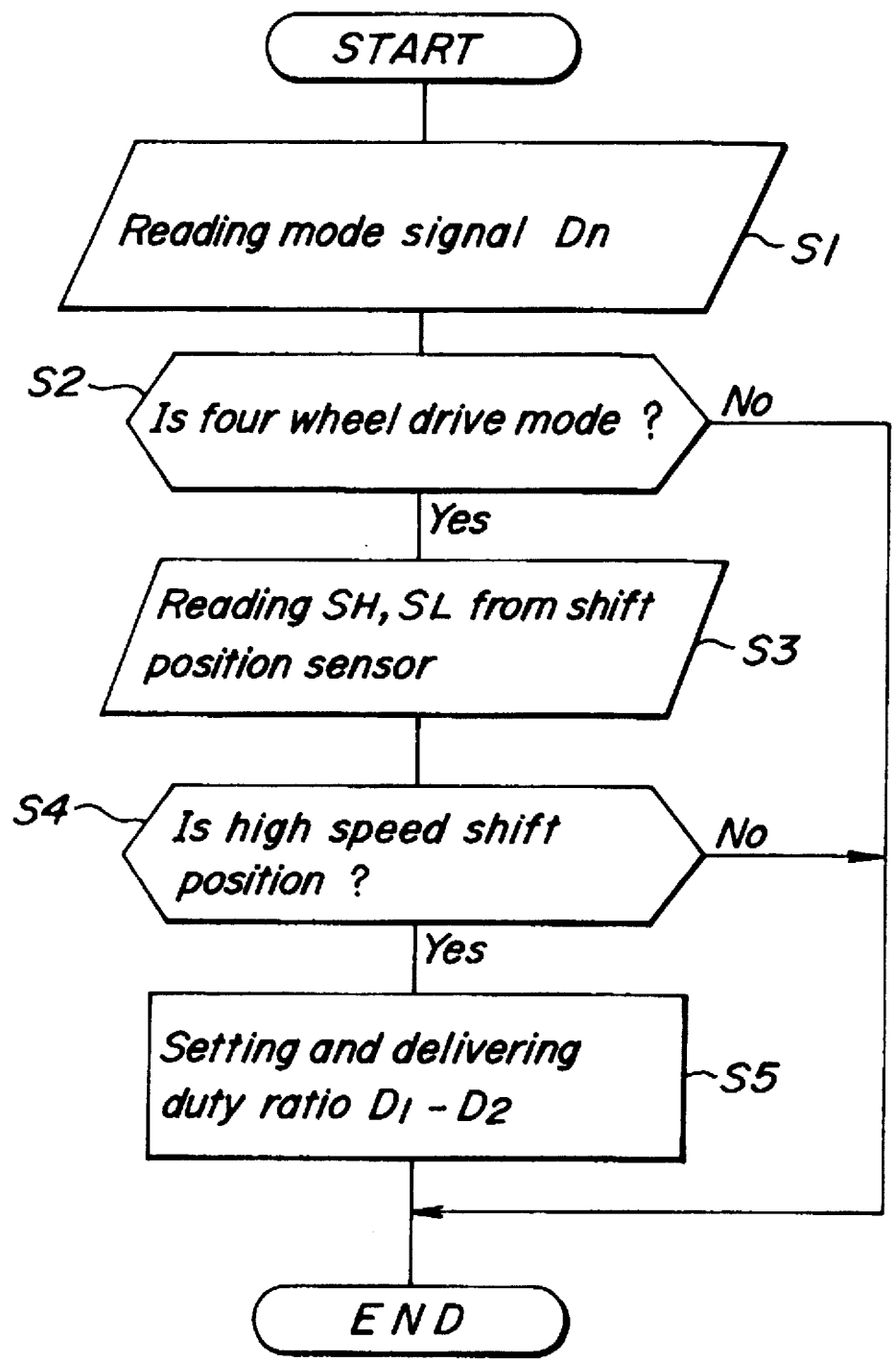
FIG. 14 is a flow-chart showing a procedure of controlling the allocation of the drive force.

Further, the microcomputer 7 in the controller executes the distribution of drive force of the friction clutch 66 in accordance with a reference computing process as shown in FIG. 14.

Brief explanation will be made of the reference computing process for the distribution of drive force. The computing process shown in FIG. 14 is executed by a timer interruption for every predetermined time (ΔT). At first, a mode signal $D_n$ is read from the 2WD–4WD mode sensor 90 at step S1. Further, whether the four wheel drive mode is selected or not is determined. If the two wheel drive mode is selected, the computation process is ended, and the procedure is returned to a main program.

If the four wheel drive mode is selected, the procedure is shifted to step S3 so as to read detection signals $S_L$, $S_H$ from the high-speed shift position sensor 86 and the low-speed shirt position sensor 88.

Further, at step 4, whether the shift sleeve 64 is shifted to the high-speed shift position H or not is determined. If it is shifted to the high-speed shift position H, the procedure is shifted to Step 5, but if not, the computing process is ended and is returned to the main program.

At step S5, in accordance with the difference in rotational speed between the front and rear wheels, that is, the rotational speed difference ΔN, the memory tables corresponding to FIGS. 11 to 13 are referred to so as to compute a duty ratio in the range from $D_1$ to $D_2$ corresponding to the rotational speed difference ΔN, and the control signal $CS_0$, $CS_1$ corresponding to the thus calculated duty radio are delivered to the drive circuits 31a, 31b. Then the procedure is returned to the main program.

Next, explanation will be made of a process executed by the microcomputer 8 in the controller 18 during drive control of the motor 102 with reference to FIG. 15.

The motor drive control process for the motor 102 is executed by a predetermined interruption, and that is, when a key switch is turned so as to energize a power source, the microcomputer 8 starts the control. Further, predetermined parameters such as a start period count value $t_{TC}$, a drive time count value $t_{MC}$, a status flag F and an auxiliary status flag $F_A$ are initially set to zero, and thereafter, the motor drive control process as shown in FIG. 15 is executed, At first, whether the 2WD mode is selected or not is determined in accordance with mode data $D_n$ delivered from the 2WD–4WD mode sensor 90 at step S21. If the 2WD mode is selected, the procedure is shifted to step S22.

At step S22, a signal indicating a vehicle speed V detected by the vehicle speed sensor 94 at the present time, and the procedure is advanced to step S23.

Further, at step S23, whether the vehicle speed V at the present time exceeds a preset motor drive vehicle speed NV (for example, 30 Km/h) or not is determined. If the vehicle speed is higher than the motor drive vehicle speed NV, the procedure is advanced to step S29, but if not, the procedure is advanced to is step S24.

At step S24, whether the status flag F which indicates that the motor 104 is energized or deenergized, is set to F=0 or not is determined. If the flag F is reset to F=0 (the deenergized condition), whether the auxiliary status flag $F_A$ which indicates that the motor 102 is energized or not in a motor auxiliary drive process at step S40 which will be detailed, is set to $F_A$=1 or not is determined at step S25. If it is not $F_A$=1, it is determined that the motor 102 is not on energization in the motor auxiliary drive process, and the procedure is shifted to step S26.

At step S26, an operating signal So as a turn-on signal is delivered to the motor drive circuit 103, and the procedure is shifted to step S27. Accordingly, the motor drive circuit 103 produces a drive signal $CS_2$ in accordance with a control signal $S_M$ based upon a value detected by the oil temperature sensor 130, and delivers the same to the motor 102 which is therefore started.

Meanwhile, if the auxiliary flag $F_A$ is set to $F_A$=1 at step S25, it is determined that the motor is on energization in the motor auxiliary drive process, and the procedure is advanced to step S7.

At step S27, the status flag F is set to F=1, and then, at step S28, the auxiliary status flag $F_A$, the start period count value $t_{TC}$, the drive time count value $t_{MC}$ which have been set and store in the memory part and the like during the motor auxiliary drive process at step S28 are all set to zero, and thereafter the procedure is returned to the main program.

If the status flag F is set to F=1 (drive condition) at step S24, the procedure is ended directly, and returned to the main program.

Figure 16:
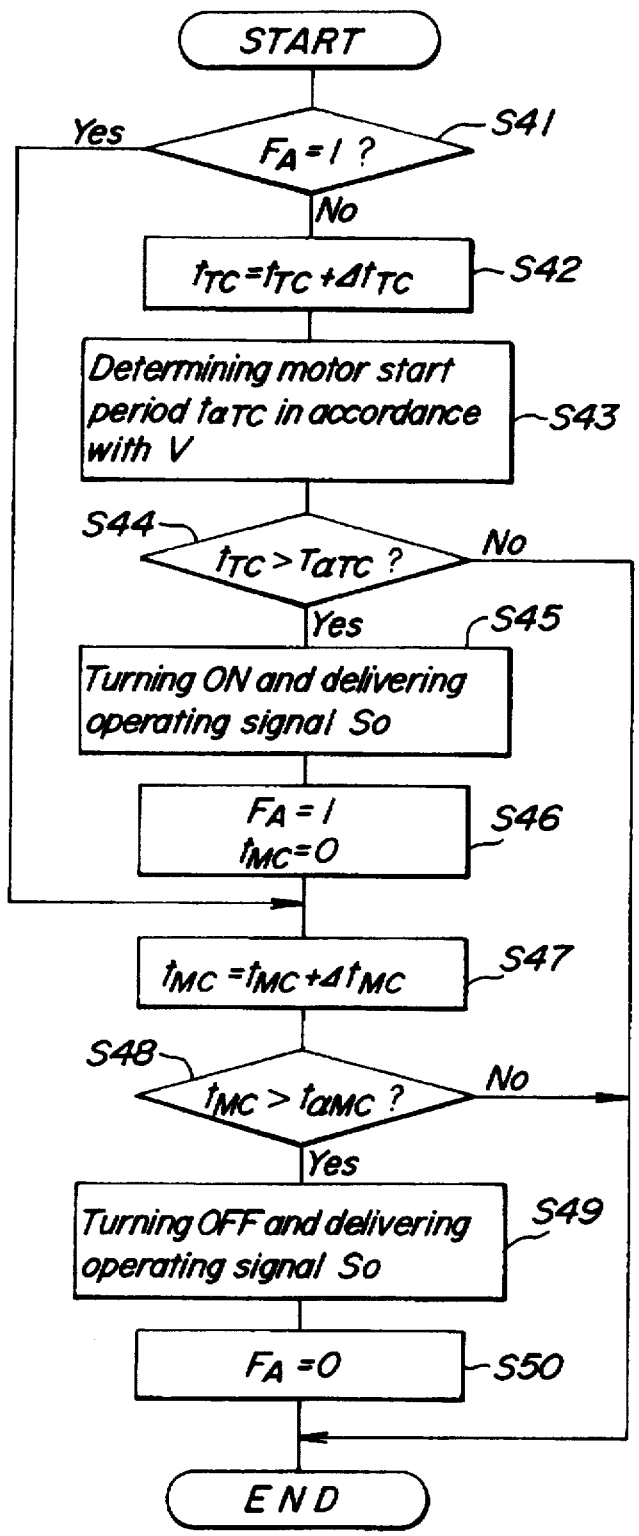
FIG. 16 is a flow-chart showing a procedure of auxiliary controlling the motor.
Figure 17:
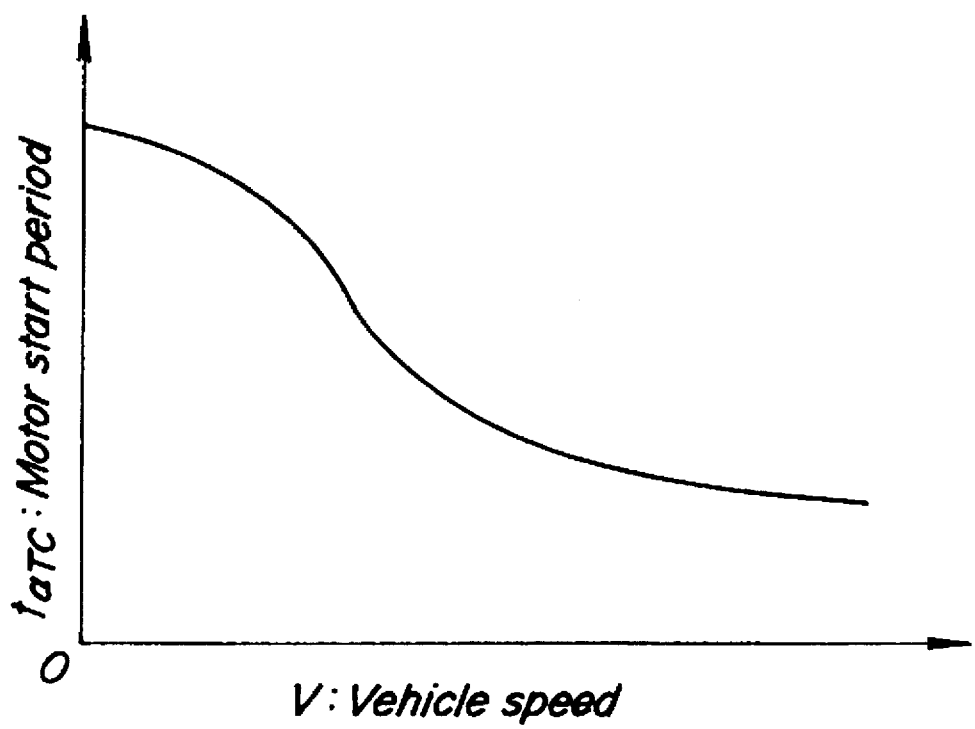
FIG. 17 is a view showing a characteristic curve exhibiting the relationship between a vehicle speed and a motor starting cycle period $t\alpha_{TC}$.

Meanwhile, at step S29, whether the status flag F is set to F=1 or not is determined, and if the status flag F is not set to F=1, the procedure is shifted to step S40 at which the motor auxiliary drive process as shown in FIG. 16 is executed, and the procedure is returned to the main program.

Further, if the status flag F is set to F=1 at step S29, the operating signal $S_O$ is set to be turned off at step S30, and is then delivered to the motor drive circuit 103. Since the operating signal $S_O$ is zero, the delivery of the drive signal $CS_2$ to the motor 102 is ceased, so that the motor comes to a stop.

Next, at step S31, the status flag F is reset to F=0, and the procedure is ended and is then returned to the main program.

Meanwhile, if it is determined that the vehicle does not select the 2WD mode, in accordance with mode data $D_n$ obtained from the 2WD–4WD mode sensor 90 at step S31, whether the status flag F is set to F=1 or not, that is, whether the motor 102 is on energization or not, is determined. If F=1, it is determined that the motor 102 is on energization, the procedure is ended directly, but if F=0, it is determined that the motor 102 is on deenergization, the procedure is shifted to step S33.

At step S33, whether the auxiliary status flag $F_A$ is set to $F_A=1$ or not, that is the motor 102 is energized in the motor auxiliary drive process or not is determined, and if the auxiliary status flag $F_A$ is not set to $F_A=1$, it is determined that the motor 102 is deenergized. Then, the procedure is shifted to step S34, and the operating signal $S_0$ as a turn-on signal is delivered to the motor drive circuit 103. The procedure is then shifted to step S35.

At step S35, the status flag F is set to $F_A=1$, and the start period count value $t_{TC}$, the drive time count value $t_{MC}$ and the auxiliary status flag $F_A$ are all set to zero. Then, the procedure is ended and is returned to the main program.

FIG. 16 is a flow-chart which shows the motor auxiliary drive process at step S40.

At step 41, whether the auxiliary status flag $F_A$ which indicates that the motor is energized or not, is set to $F_A=1$ or not is determined, and if the auxiliary status flag $F_A$ is not set to $F_A=1$, the procedure is shifted to step S42.

At step S42, the start period count value $t_{TC}$ is added thereto with a predetermined start period adding value $\Delta t_{TC}$ is added, and $t_{TC}=t_{TC}+\Delta t_{TC}$ is set to the new start period count value $t_{TC}$. Then, the procedure is shifted to step S43, and a table which has been previously stored in the memory part or the like, and which exhibits such a relationship between the vehicle speed V and the start period of the motor 102 that the period with which the motor 102 is started becomes shorter as the vehicle speed increases, is searched so as to locate a start period $t\alpha_{TC}$ of the motor 102 corresponding to a vehicle speed detected by the vehicle speed sensor 94 at the present time, and then, the procedure is shifted to step S44.

Further, at step S44, whether the start period count value $t_{TC}$ is greater than the motor start period count value $t\alpha_{TC}$ or not is determined, and if it is not $t_{TC}>t\alpha_{TC}$, it is determined that a predetermined time has not yet elapsed from the previous motor start time. Accordingly, the procedure is ended. But if $t_{TC}>t\alpha_{TC}$, the predetermined time has been elapsed from the previous motor start time, and the procedure is shifted to step S45.

At step S45, the operating signal $S_0$ as a turn-on signal is delivered to the motor drive circuit 103, so that the motor drive circuit 103 produces a drive signal $CS_2$ in accordance with the control signal $S_M$ and delivers the same to the motor 102. Accordingly, the motor 102 is energized.

Then, at step S46, the drive time count value $t_{MC}$ for setting a drive time of the motor 102 is reset to $t_{MC}=0$, and the auxiliary status flag $F_A$ is set to $F_A=1$. Then the procedure is shifted to step S47.

Meanwhile, at step S46, if the auxiliary status flag $F_A$ is set to $F_A=1$, it is determined that the motor 102 is on energization in the motor auxiliary drive process, and the procedure is shifted directly to step S47.

At step S47, the drive time count value $t_{MC}$ is added thereto with a predetermined drive time adding value $\Delta t_{MC}$ is added, and $t_{MC}=t_{MC}+\Delta t_{MC}$ is set to the new drive time count value $t_{MC}$. Then, the procedure is shifted to step S48.

At step S48, whether the drive time count value $t_{MC}$ is greater than the drive time $t\alpha_{MC}$ of the motor 102 with which occurrence of air accumulation can be prevented even though the motor is started with the above-mentioned motor start period $t\alpha_{MC}$, is determined. If it is not $t_{MC}>t\alpha_{MC}$, it is determined that the drive motor 102 has not yet energized for a predetermined drive time, and the procedure is ended directly. However, if it is $t_{MC}>t\alpha_{MC}$, it is determined that the motor 102 has been energized for the predetermined time, and the procedure is shifted to step S49. The operating signal $S_0$ as a turn-off signal is delivered to the motor drive circuit 103, so that the motor drive circuit 103 ceases the delivery of the drive signal $CS_2$ to the motor 102. Accordingly, the motor 102 comes to a stop.

At step S50, the auxiliary flag $F_A$ is set to $F_A=0$, and the procedure is ended.

It is noted that the steps S21 to S35 correspond to the motor control mans, steps S23 and S29 correspond to the motor control condition detecting means, and further, step 40 corresponds to the motor auxiliary control means.

Next, explanation will be made of the drive transmission path of the transfer 22 and the running condition of the vehicle which are caused by range selection of the auxiliary speed change lever.

It is noted that with the use of the auxiliary speed change lever, four modes, that is, a rear two wheel drive high speed range (2H range), a four wheel drive high speed range (4H range), a neutral range (N range) and a four drive low speed range (4L range), can be set. If the 4L range or the 4H range is selected, a four wheel drive mode signal $D_n$ is delivered to the controller 18 from the 2WD–4WD mode sensor 90.

At first, if the N range is selected, the shift sleeve 64b is slid to the neutral position N as shown in the upper section of FIG. 4. In this case, the shift sleeve 64b is not meshed with any of the high speed shift gear 64c, the low speed shift gear 64d and the four wheel drive gear 40 so that no transmission path is ensured and none of the wheels is driven.

If the 2H range is selected, a two wheel drive mode signal $D_n$ is delivered to the controller 18 from the 2WD–4WD mode sensor 90, so that the controller 18 does not perform the hydraulic pressure supply control. Thus, no clutch pressure $P_C$ is fed to the inlet port 74 of the transfer 22.

The shift sleeve 64b is slid to the high speed position H as shown in the upper section of FIG. 4 so that the internal teeth $64b_1$ is meshed with the high speed shift gear 64c, and the drive force of the input shaft 42 is transmitted as a high speed drive force through a transmission path consisting of the high speed shift gear 64c, the internal teeth $64b_1$ and the first output shaft 44. However, since the friction plates 66b and the friction discs 66d in the friction clutch 66 are fastened together, no transmission path to the second output shaft 54 is ensured. Thus, the wheel can run in a high speed two wheel drive condition.

If the 4H range is selected, a four wheel drive mode signal $D_n$ is delivered to the controller 18 from the 2WD–4WD mode sensor 90, the memory tables corresponding to FIGS. 11 to 13 are referred to so as to compute a duty ratio D in the range from $D_1$ to $D_2$ in accordance with a rotational speed difference $\Delta N$ between the front and rear wheels at step S5 in FIG. 14 since a detection signal $S_H$ is delivered from the high speed shift position sensor 86 at this time, and control signals $CS_0$, $CS_1$ corresponding to the duty ratio D are delivered to the drive circuits 31a, 31b. Accordingly, the drive circuit 31a delivers a predetermined exciting current $i_0$ to the solenoid 128d of the hydraulic pressure supply device 16, and the drive circuit 31b delivers a predetermined exciting current $i_i$ to the solenoid 120d of the solenoid selector valve 120.

Accordingly, the inlet port 120A and the outlet port 120B of the solenoid selector valve 120 are communicated together so that a control pressure is fed to the pilot port 126c of the pilot selector valve 126. Thus, the pilot selector valve 126 takes the 4WD mode position 126c under control, and the clutch pressure regulating valve 122 is controlled by a control pressure fed from the duty control solenoid valve 128. Accordingly, the clutch regulating valve 122 feeds a secondary pressure in the range from $P_1$ to $P_2$, as a clutch pressure $P_C$, into the inlet port 74 (friction clutch 66) through the intermediary of the pilot selector valve 126.

Further, the drive force of the input shaft 42 is transmitted as a high speed drive force through the transmission path consisting of the high speed shift gear 64c, the internal teeth $64b_1$ and the first output shaft 44. Thus, the high speed drive force of the first output shaft 44 is transmitted through a transmission path consisting of the friction clutch 66 which has been fastened at a predetermined torque distribution ratio, the first sprocket 68, the chain 72, the second sprocket 70 and the second output shaft 54, so that the vehicle can run in the high speed four wheel drive mode.

If the 4L range is selected, the shift sleeve 64b is slid to the low speed position L as shown in the lower section of FIG. 4, and the low speed gear 64d is meshed with the external teeth $64b_2$. Simultaneously, the four wheel drive gear 80 is meshed with the internal gear $64b_1$.

Further, since the low speed shift gear 64d is rotated at a speed reduced from that of the input shaft 42 due to the planetary gear mechanism 62, the drive force of the input shaft 42 is transmitted as a reduced speed drive force through the transmission path consisting of the low speed shift gear 64d, the external teeth $64b_2$, the internal teeth $64b_1$ and the first output shaft 44. Simultaneously, the reduced speed drive force of the first output shaft 44 is transmitted through the transmission path consisting of the internal teeth $64b_1$, the four wheel drive gear 80, the first sprocket 68, the chain 72, the second sprocket 70 and the second output shaft 54. Accordingly, the vehicle can run in the high speed four wheel drive condition.

Further, at this time, the motor 102 is energized under control in accordance with the motor drive control process. In the case of selection of, for example, the 4H range or the 4L range, since a mode signal $D_n$ from the 2WD-4WD mode sensor indicates the four wheel drive mode in the process of the step S21 shown in FIG. 15, the procedure is shifted to step S32. At this time, if the motor 102 is deenergized even in the motor auxiliary drive process, since the auxiliary status flag is set to $F_A=0$, the procedure is shifted from the step S33 to the step S34, and the operating signal $S_O$ as a turn-on signal is transmitted to the motor drive circuit 103. At step S35, since the status flag is set to F=1, and the auxiliary status flag $F_A$, the start period count value $t_{TC}$ and the drive time count value $t_{MC}$ are set to zero, the motor 102 is energized in the case of selection of the four wheel drive mode. Thus, the subpump 104 is driven so that a sufficient line pressure $P_L$ can be obtained although the rotary drive force of the first output shaft 44 cannot be sufficiently obtained.

Figure 15:
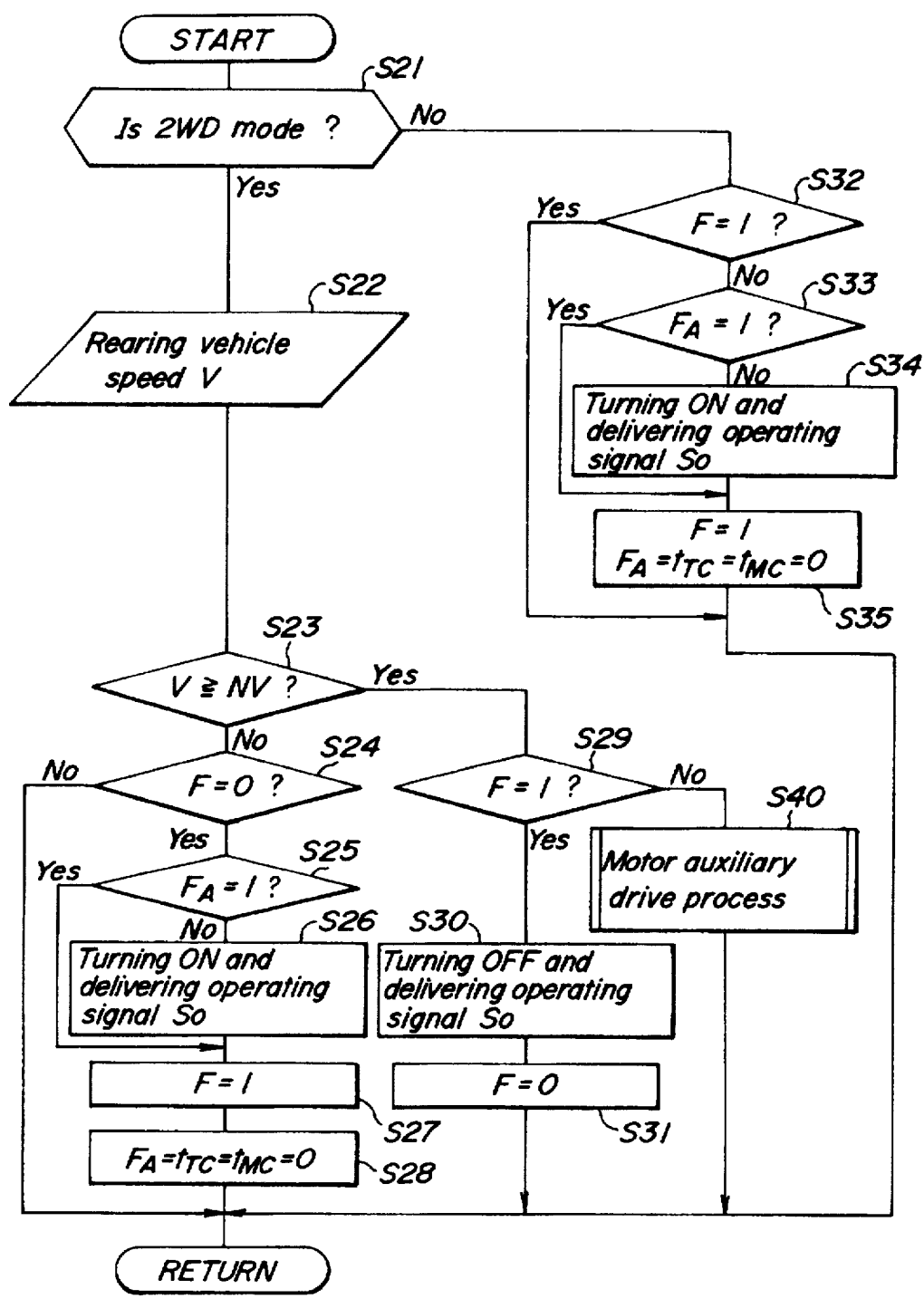
FIG. 15 is a flow-chart showing a procedure of controlling the energization of a motor.

Similarly, the procedure is shifted from step S21 to step 32 as shown in FIG. 15 even in the neutral condition or during backward running, and the motor 102 is energized so as to drive the subpump, thereby it is possible to obtain a sufficient line pressure $P_L$.

Further, if, for example, the 2H range is selected by the auxiliary speed change lever, and the vehicle runs forward at a low speed, a two wheel drive mode signal $D_n$ is delivered to the controller 18 from the 2WD-WD mode sensor 90. Thus, the procedure is shifted from step S21 to step S22 in the motor auxiliary drive control process shown in FIG. 15. At this time, a vehicle speed V is read. Since the vehicle runs at a low speed at this time, the vehicle speed V is V≧NV, so that the procedure is shifted from step S23 to S24. The procedure from step S24 to S28 is executed so that the operating signal $S_O$ as a turn-on signal is delivered to the motor drive circuit 103 which produces a drive signal $CS_2$ based upon a control signal $S_M$ that is set by the controller 18 in accordance with a hydraulic oil temperature in the oil tank 105 and the like. Accordingly, the motor 102 is energized to drive the subpump 104, that is, both main pump 100 and subpump 104 are operated, thereby it is possible to ensure a predetermined line pressure $P_L$.

Figure 7:
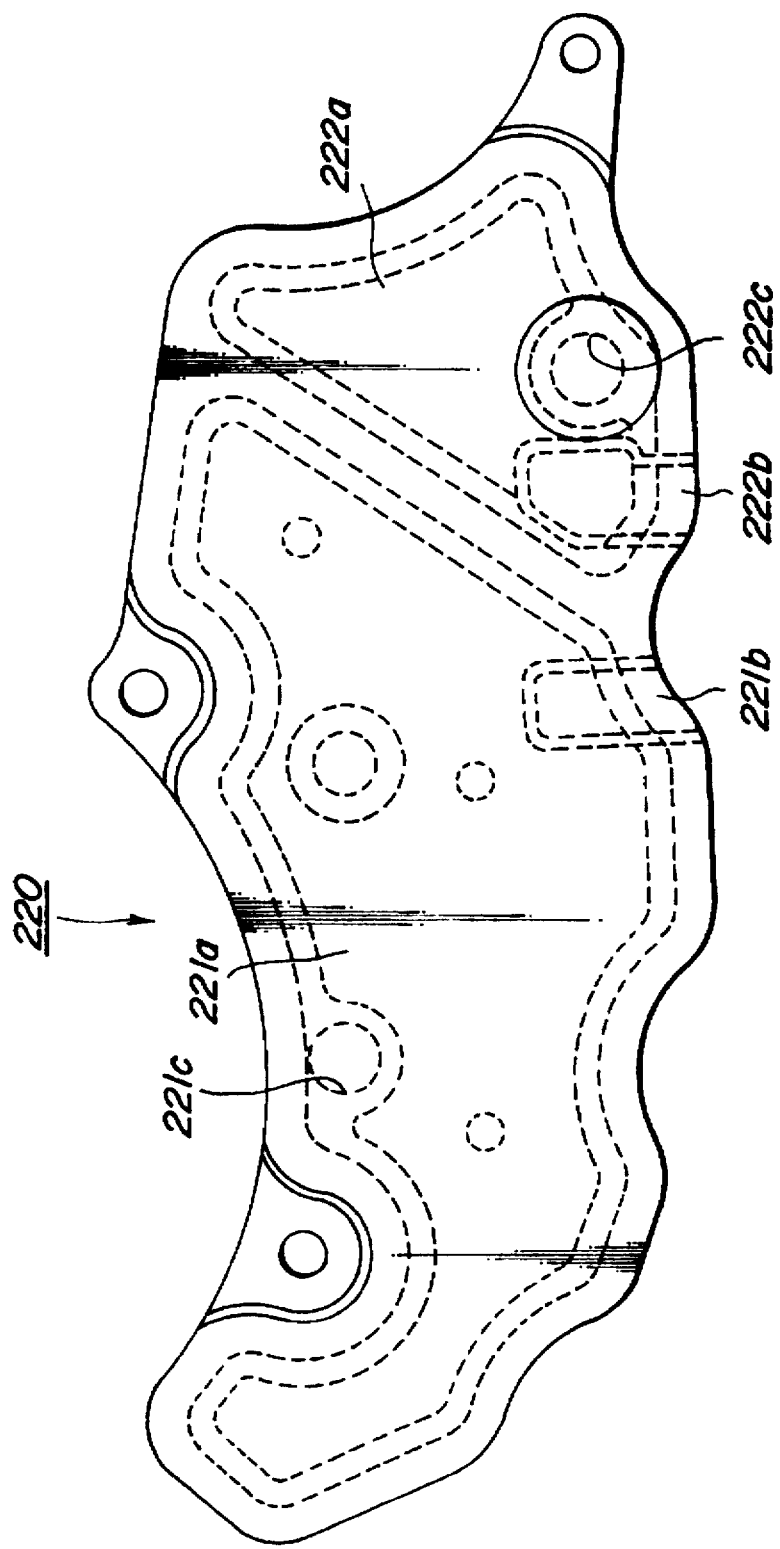
FIG. 7 is a plan view illustrating the strainer unit.

At this time, as shown in FIG. 7 and FIG. 8, the chain 72 is rotated so that hydraulic oil in the oil tank 105 is agitated, so that air is mixed into the hydraulic oil. However, since the hydraulic oil mixed with air is discharged from the discharge ports, no air is accumulated in the strainer chambers 221a, 222a for the main pump 100 and the subpump 102.

Further, since the vehicle runs forward at a low speed in this 2WD mode, the procedure is shifted to step S29 due to V≧NV at step S23 shown in FIG. 15 if the vehicle speed increases. At this time, since the motor 102 is on energization so that the status flag F is set to F=1, the procedure is shifted to step S30, so that an operating signal $S_O$ as a turn-off signal is delivered to the motor drive circuit 103.

Accordingly, the motor drive circuit 103 ceases the delivery of the drive signal $CS_2$ to the motor 102, and the motor 102 thus comes to a stop.

Further, if the vehicle speed still N≧NV, the procedure is shifted from step S23 to S29, and since the status flag is set to F=0 at this time, the procedure is shifted to step S40 to execute the motor auxiliary drive process.

At this time, the motor 102 is energized in the motor auxiliary drive process so that the auxiliary status flag is set to $F_A=0$, and the procedure is shifted from step S41 to S42. The start period count value $t_{TC}$ is added with the preset start period adding value $\Delta t_{TC}$ so as to obtain a new start period count value $t_{TC}$. Further, the memory tables stored in the memory part or the like is searched for locating a motor start period $t\alpha_{TC}$ corresponding to the vehicle speed V at this time.

Further, whether the start period count value $t_{TC}$ is larger or not is determined, and since it is still $t_{TC}<t\alpha_{TC}$, the procedure is ended directly, and is returned to the main program.

If the vehicle speed V is still V≧NV, the start period count value $t_{TC}$ is added one by one with the preset start period adding value $\Delta t_{TC}$ so as to be updated until it becomes $t_{TC}<t\alpha_{TC}$. Then, the comparison with the motor start period $t\alpha_{TC}$ corresponding to the vehicle speed at this time is carried out, and when it becomes $t_{TC}<t\alpha_{TC}$, the procedure is shifted from S44 to S45. Therefore, the operating signal $S_O$ as a turn-on signal is delivered to the motor drive circuit 104 so that the motor 102 is started.

Until the preset predetermined time $t\alpha_{TC}$ elapses after the operating signal $S_O$ as a turn-on signal is delivered to the motor drive circuit 104, that is, until the drive time count value $t_{MC}$ becomes $t_{MC}>t\alpha_{MC}$, the motor 102 is energized. If the drive time count value $t_{MC}$ becomes $t_{MC}>t\alpha_{MC}$, the procedure is shifted from step S48 to S49, and the operating signal $S_O$ as a turn off signal is delivered to the motor drive circuit 103 so as to deenergized the motor 102, and to set the auxiliary flag to $F_A=0$.

This operation is repeated as far as the vehicle speed is V≧NV, and the operating signal $S_O$ as a turn-on signal is delivered to the motor drive circuit 103 with the timing of the motor start period $t\alpha_{TC}$ which is set in accordance with the vehicle speed V, and the motor 102 is energized so as to drive the subpump 104 for the preset predetermined drive time $t\alpha_{MC}$. After the drive time $t\alpha_{MC}$ elapses, the operating signal $S_0$ as a turn off signal is delivered to the motor drive circuit 103 so as to cease the operation of the motor 102.

Accordingly, the subpump 104 is operated for the drive time $t\alpha_{MC}$ with the timing of the motor start period $t\alpha_{TC}$ in accordance with the vehicle speed V.

Further, during the energization of the motor 102 in the motor auxiliary drive move, if the vehicle speed becomes V<NV by deceleration, for example, the procedure is shifted from step S23 to S24. At this time, since the status flag is F=0, the procedure is shifted to S25. Since it is during the energization of the motor 102 in the motor auxiliary drive process, the auxiliary status flag $F_A$ is $F_A$=1. Thus, the procedure is shifted from step S25 to step S27 so as to set the status flag F to F=1, and to reset to the auxiliary status flag $F_A$, the start period count value $t_{TC}$ and the drive time count value $t_{MC}$ to zero. Thereafter, similar to the conventional arrangement, the motor 102 is energized until the vehicle speed $V_n$ becomes V≧NV.

Further, for example, when the motor 102 is on deenergization so as to wait a period in which the motor 102 is energized by the motor auxiliary drive process, if the vehicle speed V becomes V<NV, since the auxiliary status flag $F_A$ becomes $F_A$=1, the procedure is shifted from step S25 to step S26. The operating signal $S_0$ as a turn-on signal is delivered to the motor drive circuit 103, and then, the procedure from step S27 and step 28 is executed. Then the flag F is set to F=1, and further, the auxiliary status flag $F_A$, the start period count value $t_{TC}$ and the drive time count value $t_{MC}$ are reset to zero. Subsequently, the motor 102 is energized until the vehicle speed V is V≧NV.

Further, for example, during forward running in the 2WD mode, when the vehicle speed V is V<NV so that the motor 102 is energized, if the mode is changed into the 4WD mode, since the mode signal $D_n$ from the 2WD-4WD mode sensor 90 indicates the 4WD mode at step 21 shown in FIG. 15, the procedure is shifted to step 32. At this time, since the vehicle speed V is V<NV, and the motor 102 is energized, the motor 102 is continuously driven until the mode is changed from the 4WD mode into the 2WD mode, similar to the conventional arrangement.

Further, for example, during forward running in the 4WD mode, when the vehicle speed V is V≧NV, if the mode is changed into the 4WD mode, as mentioned above, the procedure is shifted from step S21 to step S32. At this time, if the motor 102 is energized in the motor auxiliary drive process, since the status flag is F=0 and the auxiliary status flag $F_A$ is $F_A$32 1, the procedure is shifted from step S32 to Step S33 and to step S34, and the operating signal $S_0$ as a turn-on signal is delivered to the motor drive circuit 103. Thereafter, the status flag is set to F=1, the parameters used in the motor auxiliary drive process, such as the automatic period count value $t_{TC}$, the drive time count value $t_{MC}$ and the auxiliary status flag $F_A$ are set to zero. Subsequently, the motor 102 is energized until the mode is changed into the 2WD mode as is similar to the conventional case.

Accordingly, when the vehicle speed becomes V≧NV, the motor 102 having been energized is deenergized so that the subpump 104 is also stopped simultaneously, and the main pump 100 alone is operated. At this time, the subpump 102 is not always stopped while the vehicle speed is V≧NV, but the motor 102 is started at the motor start period $t\alpha_{TC}$ in accordance with the vehicle speed V, and the subpump 104 is operated.

Accordingly, at this time, the chain 72 is turned in association with the rotation of the clutch hub 66c which is driven by a drive force into which the drive force is distributed in accordance with a clutch pressure $P_C$ so as to agitate hydraulic oil in the oil tank 105. As a result, air is mixed into the hydraulic oil. However, since the main pump 100 is operated when the chain is turned, no air is accumulated in the strainer chamber 221a for the main pump 100.

Meanwhile, when the subpump 104 is stopped, air mixed in the hydraulic oil is accumulated above the hydraulic oil in the strainer chamber 222a for the subpump 104. However, the subpump 104 is operated with the motor start period $t\alpha_{TC}$ in accordance with the vehicle speed V, and accordingly, the subpump 104 sucks up air. That is, the subpump 104 is started before the accumulation of air which causes lowering of the line pressure $P_L$ and the clutch pressure $P_C$ to occur, and the subpump 104 is operated for the drive time $t\alpha_{MC}$ with which air accumulated above the hydraulic oil can be removed, thereby it is possible to prevent occurrence of air accumulation in the strainer chamber 222a.

Accordingly, even though the motor 102 is energized so as to operate the subpump 104 when the vehicle speed V becomes V≧NV by a deceleration or the like in this condition, no air is accumulated in the strainer chamber 222a for the subpump 104, and accordingly, no air is sucked into the subpump 104. Thus, no lowering of the line pressure $P_L$ and the clutch pressure $P_C$ occurs, and thereby it is possible to surely produce the control pressure.

Further, the relational table exhibiting the relationship between the vehicle speed V and the motor start period $t\alpha_{TC}$ which are set so that the higher the vehicle speed V, the shorter the motor start period $t\alpha_{TC}$, is held in the memory part or the like. Accordingly, the motor start period $t\alpha_{TC}$ is set in accordance with the vehicle speed. The motor 102 is energized at a motor start period which is shorter as the vehicle speed increases, and thus, air is surely removed from the hydraulic oil even at a high vehicle speed, even though the speed of the turning chain 72 becomes high and the rate of mixing of air into the hydraulic oil would be high. Thereby, it is possible to surely prevent occurrence of accumulation.

It will be readily appreciated from the foregoing description that the present invention provides a vehicle transmission system which can prevent air from accumulating in the hydraulic oil due to the agitation by a chain, so as to ensure a predetermined line pressure.

While the present invention has been described above with reference to a specific embodiment, it has been presented by way of example only, and various changes or modifications may be made without departing from the scope of the invention as defined by the appended claims.

For example, it has been explained in the above-mentioned embodiment that the higher the vehicle speed, the shorter the period with which the motor 102 is started, and that the motor 102 is energized for a preset predetermined time $t\alpha_{MC}$. However it is also possible to set the start period of the motor 102 to be constant while the drive time is set to be longer as the vehicle speed is higher. Further, the start period and the drive time of the motor 102 can be set so that the higher the vehicle speed, the shorter the start period but longer the drive time.

Further, in the above-mentioned embodiment, the four wheel drive vehicle based upon the rear wheel drive vehicle has been explained. However, the present invention should not be limited to the above-mentioned embodiment, and it is noted that same technical effects and advantages as those obtained by the above-mentioned embodiment may also expected from a four wheel drive vehicle based upon a front wheel drive vehicle.

Also, the above-mentioned embodiment, it has been explained that the transmission torque ΔT to the front wheel side is determined in accordance with the rotational speed difference between the front and rear wheels so as set the four wheel drive condition. However, instead of the rotational speed difference between the front and rear wheels, forward and backward accelerations may be detected in order to change the mode from the two wheel drive mode into the four wheel drive mode during rapid start or rapid acceleration.

Further, in the above-mentioned embodiment, it has been explained that microcomputers are used for the controller 18. However, the controller 18 may be composed of a combination of electronic circuits such as counters, comparators and the like.

Moreover, it has been explained in the above-mentioned embodiment that the controller 18 is composed of two microcomputers for executing the motor drive process and the drive force allocation control process, respectively. However, it is also possible to use only a single microcomputer since both motor drive process and drive force allocation control process are executed by constant period interruption.

Furthermore, in the above-mentioned embodiment, it has been explained that the chain is used for transmitting the drive force between the input and the output shafts. However, for example, a gear mechanism may be arranged between the input and output drive shafts in order to transmit the drive force.

What is claimed is:

1. A vehicle transmission system comprising:

an input shaft to which a drive force is transmitted from a rotary drive source;

output shafts for transmitting the drive force from said input shaft to wheel sides;

a hydraulic circuit for feeding hydraulic fluid having a predetermined pressure so as to change the drive force transmitted from said input shaft; a main pump driven by the drive force transmitted from said rotary drive source and a subpump driven by a motor;

fluid pressure supply means for feeding a predetermined pressure based upon a hydraulic fluid pressure given by said main pump and said subpump which suck up hydraulic fluid from a tank, into said hydraulic circuit;

motor control means for controlling drive of said motor in accordance with a predetermined condition;

motor control condition detecting means for detecting a condition of the motor controlled by said motor control means; and motor auxiliary control means for energizing said motor with a preset predetermined timing for a predetermined drive time during a period in which said motor control condition detecting means detects a stopping control condition of said motor, and including vehicle speed detecting means for detecting a vehicle speed, wherein at least either said predetermined timing with which said motor is started, or said predetermined drive time with which said motor is energized, is set in accordance with a vehicle speed detected by said vehicle speed detecting means.

2. A vehicle transmission system comprising:

an input shaft to which a drive force is transmitted from a rotary drive source;

output shafts for transmitting the drive force from said input shaft to wheel sides;

a hydraulic circuit for feeding hydraulic fluid having a predetermined pressure so as to change the drive force transmitted from said input shaft;

a main pump driven by the drive force transmitted from said rotary drive source and a subpump driven by a motor;

fluid pressure supply means for feeding a predetermined pressure based upon a hydraulic fluid pressure given by said main pump and said subpump which suck up hydraulic fluid from a tank, into said hydraulic circuit;

motor control means for controlling drive of said motor in accordance with a predetermined condition;

motor control condition detecting means for detecting a condition of the motor controlled by said motor control means; and motor auxiliary control means for energizing said motor with a preset predetermined timing for a predetermined drive time during a period in which said motor control condition detecting means detects a stopping control condition of said motor;

wherein said motor auxiliary control means starts said motor with intervals which are shorter as the vehicle speed increases.

3. A vehicle transmission system comprising:

an input shaft to which a drive force is transmitted from a rotary drive source;

output shafts for transmitting the drive force from said input shaft to wheel sides;

a hydraulic circuit for feeding hydraulic fluid having a predetermined pressure so as to change the drive force transmitted from said input shaft;

a main pump driven by the drive force transmitted from said rotary drive source and a subpump driven by a motor;

fluid pressure supply means for feeding a predetermined pressure based upon a hydraulic fluid pressure given by said main pump and said subpump which suck up hydraulic fluid from a tank, into said hydraulic circuit;

motor control means for controlling drive of said motor in accordance with a predetermined condition;

motor control condition detecting means for detecting a condition of the motor controlled by said motor control means; and motor auxiliary control means for energizing said motor with a preset predetermined timing for a predetermined drive time during a period in which said motor control condition detecting means detects a stopping control condition of said motor;

wherein said motor auxiliary control means energizes said motor for a drive time which is longer as the vehicle speed increases.

4. A vehicle transmission system comprising:

a rotary drive source transmitting a drive force to an input shaft;

output shafts for transmitting the drive force from the input shaft to wheels;

a main pump driven by the drive force and a subpump driven by a motor, the main pump and the subpump extracting hydraulic fluid from a tank and producing a hydraulic fluid pressure;

a motor controller for controlling drive of the motor in accordance with a predetermined condition;

a motor control condition detector for detecting a condition of the motor;

a motor auxiliary controller for energizing the motor with a preset predetermined timing for a predetermined drive time when the motor control condition detector detects a stopping control condition of the motor;

a hydraulic circuit; and a fluid pressure supplier for supplying a predetermined pressure to the hydraulic circuit, the predetermined pressure being based upon the hydraulic fluid pressure produced by the main pump and the subpump;

wherein the hydraulic circuit supplies hydraulic fluid of the predetermined pressure to a clutch, an amount of the predetermined pressure determining a level of engagement of the clutch and therefore an amount of the drive force transmitted from the input shaft such that varying the predetermined pressure varies the drive force transmitted from the input shaft, and wherein the motor auxiliary controller includes a vehicle speed detector for detecting a vehicle speed, and at least one of the predetermined timing or the predetermined drive time is set in accordance with the vehicle speed detected.

5. A vehicle transmission system as claimed in claim 4, wherein the motor auxiliary controller starts the motor at intervals which are shorter as the vehicle speed increases.

6. A vehicle transmission system as claimed in claim 4, wherein the motor auxiliary controller energizes the motor for a drive time which is longer as the vehicle speed increases.

* * * * *